US008010906B1

(12) United States Patent
Sinnard et al.

(10) Patent No.: US 8,010,906 B1
(45) Date of Patent: Aug. 30, 2011

(54) PROPERTY PRESENTATION AND VISUALIZATION METHOD

(75) Inventors: Judith Sinnard, Spring, TX (US); Marjorie Sinnard, Webster, TX (US)

(73) Assignee: JMMJ Resources, LLC, Spring, TX (US)

( * ) Notice: Subject to any disclaimer, the term of this patent is extended or adjusted under 35 U.S.C. 154(b) by 884 days.

(21) Appl. No.: 12/021,953

(22) Filed: Jan. 29, 2008

Related U.S. Application Data

(60) Provisional application No. 60/888,428, filed on Feb. 6, 2007.

(51) Int. Cl.
*G06F 3/00* (2006.01)
(52) U.S. Cl. ........... 715/771; 715/243; 715/964; 95/212
(58) Field of Classification Search .................. 715/771, 715/964, 243; 95/212
See application file for complete search history.

(56) References Cited

U.S. PATENT DOCUMENTS

| | | | | |
|---|---|---|---|---|
| 5,794,216 A | * | 8/1998 | Brown | 705/27.2 |
| 5,907,850 A | * | 5/1999 | Krause et al. | 715/234 |
| 6,556,211 B2 | * | 4/2003 | Davis | 345/582 |
| 6,904,393 B2 | * | 6/2005 | Schwalb et al. | 703/1 |
| 7,039,569 B1 | * | 5/2006 | Haws et al. | 703/7 |
| 7,062,722 B1 | * | 6/2006 | Carlin et al. | 715/850 |
| 7,127,378 B2 | * | 10/2006 | Hoffman et al. | 703/1 |
| 7,277,572 B2 | * | 10/2007 | MacInnes et al. | 382/154 |
| 7,574,323 B2 | * | 8/2009 | Rappaport et al. | 702/182 |
| 7,823,068 B2 | * | 10/2010 | Cowtan et al. | 715/738 |
| 2006/0036513 A1 | * | 2/2006 | Whatley et al. | 705/27 |
| 2008/0027878 A1 | * | 1/2008 | Street et al. | 705/78 |
| 2008/0126022 A1 | * | 5/2008 | Hoguet | 703/1 |
| 2008/0126980 A1 | * | 5/2008 | Bachmann et al. | 715/804 |
| 2009/0138113 A1 | * | 5/2009 | Hoguet | 700/98 |

* cited by examiner

*Primary Examiner* — Ryan Pitaro
(74) *Attorney, Agent, or Firm* — Buskop Law Group, PC; Wendy Buskop

(57) ABSTRACT

A property presentation and visualization method comprising measuring at least one room comprising a room length and a room width forming at least one measurement line, measuring at least one wall interruption comprising a wall interruption length and a wall interruption width, and measuring at least one outside space. The room measurement, wall interruption measurement, and outside space measurement are input to a processor. Textual information and at least one graphic image concerning the structure are input to the processor. A property overview image of the structure and the at least one outside space is formed using computer instructions, the room measurement, the wall interruption measurement, the measurement lines, the text information, and the graphic images. The property overview image is then output for viewing.

17 Claims, 8 Drawing Sheets

350 — SAMPLE – Amenities List & Printable Floor Plan | Return to Floor Plan | 310a

PROPERTY PROFILE — 352
- 3,438 sq ft Home (per HCAD)
- 790 sq ft Pool House (per HCAD) — 73
- Home built in 1989 (per HCAD)
- Pool House built in 2000 (per HCAD)
- 15,000 sq ft Lot (per HCAD)

FIRST FLOOR — 355
360a

FOYER/ENTRY | 8' x 10' 1" | — 330a
8' stained wood door with glass beveled
accent panels and beveled glass sidelights
Custom stained and painted hardwood floor
  by Decorative Arts, Inc.
Stairway with hardwood treads and custom d — 72a
  wrought iron & gold leaf balustrade with
  wood rail
Hall Closet
Multi-piece crown molding
PAR 38 directional recessed lighting
Double French pocket door to Family Room 360b

LIVING ROOM | 13' 5" x 17' | — 330b
Windows with plantation shutters
Cased opening to Entry Foyer
Multi-piece crown molding — 72b
PAR 38 directional recessed lighting and
  recessed directional halogen spotlights
Built-in speakers with volume control 360c KITCHEN — | 11' 9" x 10' 7" | — 330c
Stainless double sink with GROHE single
  lever fixture set in slab granite counter
  with slab granite backsplash
Custom cabinets with wrought iron
  Pulls, tray storage, full extension pull-out
  pan drawers, lazy Susan corner storage
  unit
Stained alder island with slab granite top,
  cabinet access from two sides, and built-in
  appliance bam
Two compartment trash drawer — 72c
DACOR Microwave
DACOR self cleaning Oven
DACOR Warming Drawer
GE Profile Performance stainless, counter
  depth refrigerator/freezer
DACOR 4-burner gas cooktop with
  DACOR retractable vent
BOSCH stainless steel Dishwasher
Walk-in Pantry with wrap-around shelving
Decorative wallpaper
Under cabinet lighting
PAR 38 directional recessed lighting 360d BREAKFAST — | 14' x 8' 2" | — 330d
Bay window, with V-Kool 70 coating, alcove — 72d
  with custom upholstered banquette seating
Roman shades
Decorative wallpaper
PAR 38 directional recessed lighting

Figure 8

310b — Return to Floor Plan

PROPERTY PRESENTATION AND VISUALIZATION METHOD

CROSS REFERENCE TO RELATED APPLICATIONS

The present application claims priority to co-pending U.S. Provisional Patent Application Ser. No. 60/888,428 filed on Feb. 6, 2007, the entirety of which is incorporated herein by reference.

FIELD

The present embodiments relate to a property presentation and visualization method for forming an interactive image of a property.

BACKGROUND

A need exists for a method for forming an interactive image of a property that compiles an interactive property overview image for a property, a listing of features for the property, and one or more digital images of selected interior and exterior views of structures and outside spaces within the property, into a single file, allowing a user to individually or simultaneously access the property overview image, the textual information, and the one or more digital images.

A further need exists for method for forming an interactive image of a property that incorporates accurate on-site measurements for one or more rooms of a structure or one or more dimensions of an outside space or geographical feature, records such measurements within a file relating to the property, and produces a property overview image that is drawn to scale, using one or more measurement lines representative of actual on-site measurements.

A need exists for a property presentation and visualization method that produces graphical images that correspond to interior details of structures, such as the inside of closets, cabinetry, appliances, ceiling lines and features, roof lines and features, windows, flooring, and attics, and graphical images that correspond to outdoor details, such as the locations and dimensions of trees, outdoor structures, lakes, farmland, fences, and other similar manmade and geographical outdoor features.

A further need exists for a property presentation and visualization method that produces rooms and outside spaces drawn to scale, graphic images representing features, annotated text information labeling and describing features, and optionally, icons for linking to digital images in a single property overview image, providing a seamless, integrated product for use by property buyers, sellers, and real estate agents.

The present embodiments meet these needs.

BRIEF DESCRIPTION OF THE DRAWINGS

The detailed description will be better understood in conjunction with the accompanying drawings as follows:

FIG. 8 depicts an embodiment of a portion of a textual features listing relating to a structure.

Figure 1:
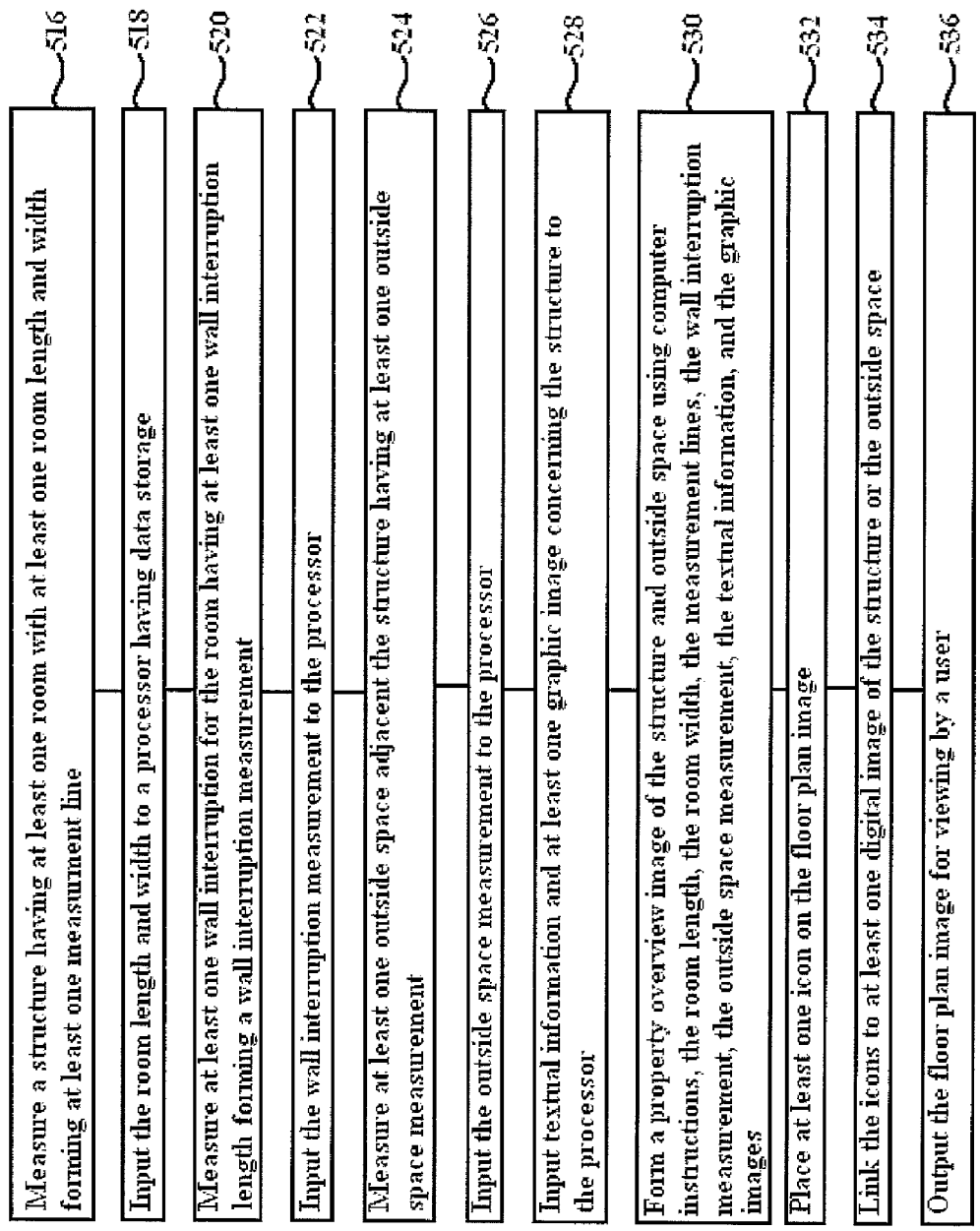
FIG. 1 depicts a flow diagram of an embodiment of the present method.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a property presentation and visualization method for forming an interactive image of a property.

The present method includes collecting on-site, contemporaneous measurements of one or more spaces within a property, which can include rooms in a structure, outdoor spaces such as yards, pastures, or lakes, and outdoor structures such as sheds, pool houses, fences, and billboards. The on-site, contemporaneous measurements of the present method provide numerous advantages over current methods, which typically use previously produced plans or blueprints to generate conventional floor plans.

Plans and blueprints are normally produced before a structure is constructed or a property is developed, and often do not reflect any changes that were made during the construction process. The present method ensures accuracy, current up-to-date information, and avoids contravening the copyright of an architect or builder in preexisting plans or blueprints.

An additional advantage of the present method is the continuity of the collected measurements. Property overview images can be drawn a short time after measurements are collected, by the same individual who collected the measurements, ensuring accuracy and validity.

A further advantage of the present method is the accuracy of the method. On-site measurements are used to create a property overview image that is drawn to scale, containing measurement lines that represent actual measurements that were taken on-site, and that are placed in the property overview image at the location where the represented measurement was taken. These measurement lines can be retained as a permanent record of each measurement collected. The measurement lines can be depicted in a finished property overview image, or the measurement lines can be removed and retained invisibly as a record of each measurement.

Additionally, multiple measurement lines, representing multiple possible measurements for a single room or outdoor space, can be collected to allow the creator of a property overview image to have multiple options when defining rooms and outdoor spaces in the property overview image. A single measurement line that best represents a dimension of a space can be selected from multiple measurement lines.

Further, the present method is uniquely useable to measure outside spaces and structures, such as yards, pools, lawns, patios, porches, garages, attics, pool houses, ranches, pastures, farmland, lakes, roads, barns, paddocks, and other outside spaces and geographical features. The present method thereby depicts an entire property, including yards, landscaping, and any structures, in a property overview image, drawn to scale. Conventional floor plans do not include yards and various other outside spaces adjacent a structure or within a property, or fail to depict outside spaces to scale, with accurately located outdoor structures and geographical features. The present method not only includes outside spaces, drawn to scale, but also includes extensive textual annotation and graphic images describing and depicting landscaping, pools, outdoor structures, such as storage sheds and gazebos, and various other outdoor features.

The measurement and depiction of outside spaces is a unique benefit of the present method, as yard space and outdoor features are often important information for potential buyers and sellers of a property.

The present method can also advantageously combine the use of satellite images with contemporaneous, on-site measurements, allowing large stretches of land, such as a 70-acre horse ranch, to be measured and depicted in a property overview image alongside an accurate, drawn-to-scale image of a house or similar structure located in or adjacent the large stretches of land.

For example, when depicting large properties, an "acreage plan" can be formed, which is a property overview image containing multiple embedded or nested floor plans and images of outdoor spaces. It is contemplated that a user viewing an acreage plan can select one or more specific areas of the acreage plan, which are linked to larger and/or more detailed floor plans and outdoor images of the specific areas. It is also contemplated that a user can magnify or shrink a displayed property overview image.

The property overview image can also be linked to numerous digital images, such as digital photographs, of rooms in a structure, exterior views of a structure within a property, and outside spaces and outside structures within the property, using icons placed in the property overview image. Each icon can be located in the property overview image at the representative location where a digital image was collected, and can depict the direction and perspective of the represented digital image. The digital images can be displayed alongside textual information relating to the depicted space, and can further contain links to lists of textual information regarding an entire structure or property.

The present method is advantageous due to its unique compilation of information. Simultaneous with the measurement process, various features, amenities, benefits, characteristics, qualities, and materials of a property can be recorded, and graphic images reflecting these features can be drawn and inserted into the property overview image. Unlike many conventional floor plans, the present method produces property overview images that also include annotated text information relating to features of a room, outside space, or outside structure displayed in the property overview image. Extensive textual annotation describing measurements, storage, built-in furniture, fixtures, textures, materials, ceiling, flooring, and various other features can be included in the property overview image.

A final property overview image can be compiled as a seamless file, with one or more floor plans, including depictions of outside spaces, linked to a features listing for a property, and linked to one or more digital images of parts of a structure and/or outside spaces. The property overview image can be magnified or reduced to facilitate viewing.

Completed property overview images can be transferred to databases and other compilations of information, so that multiple users are able to access a detailed property overview image of a property, containing graphic images and annotated text information. The property overview images can be accessed using the internet, or other similar networks.

The present method combines a birds-eye perspective of a property with measurement lines representative of contemporaneous, on-site measurements to depict hidden details or characteristics that are difficult to otherwise visualize, such as open room layouts where a conceptual separation between rooms is not clear, or large, open outdoor areas. Multiple measurement lines, that can be color-coded, can be used to depict the dimensions of alternate separations of interior or exterior open space.

The present method can further depict features and provide annotations for features not readily visible in a conventional floor plan, such as ceiling, roof, and attic lines, ceiling elevations, room and fixture materials and characteristics, and the presence of fixtures, storage, and objects.

The present method also includes the measurement of interior features such as wall interruptions, thereby recording important interior details, such as incremental wall space, that are not depicted or recorded in conventional floor plans. This information is useful for storage, arrangement and placement of furniture, and can be used by owners and potential buyers of a property to determine whether objects, such as furniture, can be maneuvered through certain wall interruptions or placed along certain wall spaces.

Because the present method produces in scale property overview images for both indoor and outside spaces, measurement opinions for any other parts of a structure or outside space can generally be provided, and such measurements need not be contiguous space or walls.

The present method can produce property overview images depicting vaulted ceilings, overhead windows, transoms, trees, billboards, and similar elevated features, using a combination of drawing with a three-dimensional perspective and utilizing specific symbols and annotation. The depiction of elevated features is desirable for owners and potential purchasers due to the light or shade elevated features can provide to a room or outside space. Similar traits cannot be readily depicted in a conventional floor plan.

The drawings and amenities text produced using the present method can be provided in various user-friendly computerized formats, such as Microsoft compatible formats, allowing the information contained within to be easily transferred via "cut-and-paste" functions into other programs and formats. This can allow for an extremely easy and efficient transfer of information when a specific real estate agent or a specific database requires text or other information having a specific format.

By compiling a property overview image, measurement lines, graphic images, digital images, and text information into a single computerized file, using icons and links to interconnect all images, the present method provides a self-contained product that is deliverable to a client, buyer, seller, or database. A user-friendly format, such as a PDF file accessible by Adobe Acrobat, which provides free software to the general public, can be used so that the images contained with the computerized file can be read by any user. The self-contained product can also be delivered to an internet site, allowing the interactive property overview image to be viewed by a widespread audience simultaneously.

The present property presentation and visualization method includes measuring at least one room of a structure, the room having at least one room length and at least one room width, thereby forming at least one measurement line.

The structure can be any kind of structure including an office building, a house, an agricultural building, a floating vessel, a semisubmersible, a stadium, a theater, a pet house, a flying vessel, a garage, a store, a library, a recreational vehicle, an apartment complex, a playhouse, a tree house, a gazebo, a religious building, a sporting area, a retail space, a meeting area, a banquet area, a convention area, and other kinds of structures or spaces.

The structure can have any number of rooms. Each room within the structure can be enclosed by walls, however it is contemplated that a room could also include a space within a structure that is not enclosed by walls, or that is only partially enclosed by walls. For example, when measuring a house having a kitchen adjacent a dining room, with no walls separating the kitchen from the dining room, the kitchen and the dining room could be conceptually divided into separate rooms, even though no physical boundaries separate the kitchen from the dining room.

As such, a room can have multiple possible room lengths and multiple possible room widths. For example, when measuring a kitchen having a breakfast nook, it may be desirable to measure the length of the kitchen excluding the breakfast nook, the length of the breakfast nook excluding the kitchen, and the total length of both the kitchen and the breakfast nook, forming three measurement lines, wherein one measurement line represents each measured length. At a later time, a decision can be made regarding whether to conceptually divide the kitchen and the breakfast nook into separate rooms, and representative measurement lines can be selected for production of a property overview image.

It is also contemplated that when measuring a non-rectangular room, multiple room lengths or room widths can be measured to appropriately record the dimensions of the room at various positions within the room.

Measurement lines can be depicted in a property overview image as a visual representation of an on-site measurement, at the location within the property overview image where the measurement was collected. Each measurement line can be a straight line with arrowhead endpoints, having a numerical label indicating the value of the measurement represented by the measurement line, though other styles of lines and labels can also be used. Because the property overview image is depicted in scale, one or more measurement lines can also be added upon request to depict an opinion of a dimension for any part of a property overview image.

It is further contemplated that one or more measurement lines can represent measurements of wall segments or incremental wall space, such as the distance along a wall until a wall interruption is encountered, the distance across a doorway, or the distance between an item of built-in furniture, such as a cabinet, shelf, or counter and an opposing wall. Measurement of these partial room lengths and partial room widths can be beneficial when a potential owner or buyer wishes to determine whether a piece of furniture or another object can be placed along a wall between two wall interruptions, or between one wall interruption and an adjacent wall. Conventional floor plans do not provide measurements of incremental wall space, which is a significant benefit of the present method.

In an embodiment, one or more room heights can also be measured. A room can have multiple room heights, such as a room with a sloping, stepped, arched, domed, or irregular ceiling or floor. In a contemplated embodiment, a single room height can be measured for an entire structure or for an entire floor within a structure. Additional room heights can then be measured in rooms having room heights that differ from that of the room height measured for the entire structure, or in rooms having irregular ceilings or irregular floors.

The present method then includes inputting the measured room lengths and room widths, and optionally room heights, to a processor in communication with data storage.

The inputting can be performed using any type of input device, such as a computer having a keyboard, mouse, touch screen, or other types of input devices. It is also contemplated that the inputting can be performed on-site, contemporaneously with the measuring, through use of a handheld wireless device, such as a personal digital assistant or cellular telephone, or through use of a portable computer.

The data storage can include fixed data storage, such as a hard drive, removable data storage, such as a flash drive or memory stick, remote data storage, such as data storage in a server in networked communication with the processor, or any combinations thereof. For example, the processor can be part of a laptop computer, and the measurements can be wirelessly transmitted over a network to a server for storage.

The present method also includes measuring at least one wall interruption for one or more of the rooms.

A wall interruption can be any gap or object that interrupts a wall, such as a window, a door, a pass-through opening, an air duct, a vent, a cased opening, an arched opening, a column, a cabinet, a counter, an item of built-in furniture, and other similar objects or openings.

Each wall interruption is contemplated to have at least one wall interruption length, such as the distance between two doorposts of a doorway. It is contemplated that a wall interruption can have multiple lengths, such as an arched doorway, or a non-rectangular window. Measurement values for wall interruptions are typically not provided in conventional floor plans and are a significant benefit of the present invention.

In an embodiment, one or more wall interruption widths and/or wall interruption heights can be measured in addition to the wall interruption length. Wall interruption elevations, such as the distance between a floor and the bottom of a window or a built-in shelf, can also be measured.

The present method includes inputting the wall interruption measurement to the processor.

Measurement of a room and one or more wall interruptions can be performed simultaneously, while providing multiple measurements of incremental wall space. For example, the distance between a first wall of a room and the beginning of a doorway could be measured and recorded. The length of the doorway could then be measured and recorded. Then, the distance between the opposite side of the doorway and a second wall of the room could be measured. The resulting three measurements would then provide not only the total length of the room, but the length of the doorway, and the amount of incremental wall space between the ends of the doorway and each perpendicular wall. Conventional measuring methods typically measure only the length and width of rooms, and do not include lengths of wall interruptions or incremental wall space.

At least one outside space adjacent the structure is also measured. The outside space is contemplated to have at least one outside space measurement, which can be a length, a width, or a diameter. Outside space measurements can also include depths, such as the depth of a pool or lake, heights, such as the height of trees and bushes, or elevations, such as the elevation of the bottom of a fence or sign from the ground. Outside space measurements can also include the distance across all or a portion of the outside space at one or more points, or any other measurement of all or a portion of the outside space that can be of import to a property owner or prospective buyer, such as distances between trees, hedges, signs, or fences.

Outside spaces can include a yard, a lawn, a courtyard, a pool, a garage, a guest house, a pool house, a second structure, a garage apartment, a parking area, a driveway, a patio, a porch, a pasture, a ranch, a barn, and any other type of area adjacent or proximate to the structure, within the same property as the structure, or otherwise able to be depicted in an image of the structure with nearby outside and additional spaces.

The measurement and depiction of outside spaces is a unique benefit of the present method, as information regarding yard space and outdoor features is often important information for potential buyers and sellers of a property. Conventional floor plans typically do not depict yards or outside spaces when depicting a property, or omit measuring the outside space and depicting the outside space to scale alongside one or more structures.

The outside space measurement is input into the processor.

Each measurement can be performed using any combination of manual, electronic, or digital measuring tools, such as through the use of a laser measurement tool, a measuring tape, or other measuring devices or measuring methods. For example, when measuring a room within a structure, measurements can be recorded by measuring along a wall of a room until the wall is interrupted by a wall interruption, such as a door or window. The wall interruption length can subsequently be measured. The remainder of the interrupted wall can then be measured until another wall interruption is encountered, until an entire room length or room width has been measured.

In an embodiment, measurements can be performed by obtaining one or more satellite images of a space and determining one or more measurements using the satellite images. This embodiment is contemplated to be especially useful when measuring large stretches of acreage that are not easily measured using manual measuring tools, such as ranches, pastures, fields, lakes, farmland, and other outdoor spaces or structures.

The present method then includes inputting textual information concerning the structure and at least one graphic image concerning the structure to the processor. The textual information is contemplated to include extensive annotations of measurements, storage, built-in furniture, fixtures, textures, materials, ceiling, flooring, other similar features, and combinations thereof, which can be displayed in the property overview image. Conventional floor plans do not provide extensive annotations of measurements, architectural details, textures, materials, and similar features.

The textual information can include a features listing of the space. The features listing can include any description of amenities, features, benefits, contents, components, materials, or characteristics of a structure, room, or outside space, in a list or tabular form, that can be categorized by room, area, type of feature, or other categorization. The features listing can be linked to the final property overview image, allowing users to seamlessly view the property overview image and a features listing for all or a portion of the property.

The one or more graphic images can be drawings, such as a drawing produced using a computer, icons, logos, clip arts, symbols, or combinations thereof. It is contemplated that one or more graphic images can correspond to one or more features listed in the textual information. For example, a computer drawing of a bird's eye view of a tree can be used to depict a tree in a yard adjacent a house by placing the graphic image of the tree in a location in a property overview image, representative of the physical location of the tree in the yard. The graphic image of the tree can be drawn to approximate the type, size, and appearance of the actual tree that is depicted.

The graphic images can depict built-in furniture, fixtures, textures, materials, ceiling, flooring, landscaping, and other similar features. Conventional floor plans typically do not display extensive, detailed graphic images that correspond to textured flooring, locations and types of landscaping, and various other interior and exterior features.

In a contemplated embodiment, one or more graphic images can be easily recognized drawings or symbols for indicating a feature or fixture of a structure or outside space, such as a depiction of a tree or a sink. Use of easily recognized drawings or symbols can allow features be visually presented and readily recognized by a user without requiring textual labels.

The present method is contemplated to include extensive textual annotations and graphic images to depict a large number of features, amenities, materials, textures, and other items not depicted in conventional floor plans.

For example, the graphic images and textual information can depict and/or annotate appliances, such as beverage coolers or refrigerators, central vacuums, cook tops, concealed televisions, directional arrows for showing direction of slide-out appliances, dish washing drawers, dishwashers, electric baseboard heaters, electric gates, freezer drawers, filtered water appliances, garage door openers, glass faced refrigerators, hot water heaters, ice makers and ice machines, microwaves, ovens and double ovens, re-circulating hot water systems, refrigerators and freezers, stoves, stacked washers and dryers, trash compactors, vent hoods, wall mounted televisions, warming drawers, washers and dryers, and water softeners.

The graphic images and textual information can also depict and/or annotate built-in items, such as aquariums, architect's easels, architectural pediments, ballet barres, banquettes, bars, benches and bench seats, built-in shelving and/or cabinets, buffet servers, carved wood pediments, chair rails, chests of drawers, coffee and/or juice bars, cornices, cubbies, desks, directional arrows for showing directions of slide-out items or door openings, drip-dry rods, dumb waiters, faux columns with ionic capitals, floor to ceiling bookcases, fold-down ironing boards, kitchenettes, laundry chutes, Murphy beds, pot racks, projectors, rolling library ladders, room dividers, saunas, shelving units, storage cubicles and cubbies, wall mounted reading lamps, wainscoting, wall mounted television trays and swivel trays, wine racks, wine rooms, and wine cellars.

The graphic images and textual information can further depict and/or annotate cabinetry items, such as adjustable mirrors, appliance barns, bookcases with concealed entry, cabinets over peninsulas, computer and printer space, directional arrows for showing directions of door openings and/or pass throughs, glass cabinets, hinged vanity mirrors, lighted display cabinets, media and/or stereo cabinets, pull-out television slides, pull-out pantry slides, pantries, platter storage, rotating shelf pantries, sewing machine cabinets, spice racks, television niches, television cabinets with retractable doors, under counter washers and dryers, upper cabinets, work benches, and tool benches.

The present method can further include graphic images and textual information depicting nonconventional features related to ceilings and ceiling lines, including second floor overhangs, attic access stairs, balconies, barrel vaulted ceilings, beamed ceilings, ceiling mounted projectors, ceiling mounted projection screens, coffered ceilings, directional arrows showing directions of vaulted roofs or sloped ceilings, domed ceilings, dropped block ceilings, dropped ceiling lines, gambrel ceilings, glass ceilings, groin vaulted ceilings, hand-painted ceilings, paneled wood ceilings, skylights, soffits, sloped ceiling lines, tray ceilings, vaulted ceilings, vaulted and ribbed ceilings, and wood beamed ceilings.

It is further contemplated that the graphic images and textual information can depict closets and closet features, such as air conditioning or maintenance closets, basket towers, butler's storage closets, broom closets, cedar closets, climate controlled storage, directional arrows showing directions of sliding mechanisms or pull down hanging bars, double hanging bars, floored attic storage, linen closets, lockable closets and/or storage, pegboard, pull-down bars, single hanging bars, triple hanging bars, utility closets, and walk-in closets.

The graphic images and textual information can further depict and/or annotate counters and under-counters, such as bars and pass-through bars, breakfast bars, butcher blocks, corner lazy susans, knee space, drawers, directional arrows showing the direction of pull-out shelves and drawers, drawer and cabinet pulls and hardware, lift-up work surfaces, slab granite and/or marble counters, slide-out keyboard trays, under counter bookcases, under counter cabinets, under counter dishwashers and dishwasher drawers, under counter drawers, under counter refrigerators, under counter lazy susans, under counter pull-out shelves, under-counter pull-out baskets, under counter swing out storage trays, under counter slotted stemware racks, under counter trash slides, under counter washers and dryers, under counter wine coolers, vanities, and wet bars.

The present method can further include graphic images and/or textual information depicting and/or annotating doors, such as bi-fold doors, cased openings, directional arrows showing the directions of sliding, swinging, or fold flat against the wall doors, swing-in and swing-out double doors, double glass doors, double pocket doors, dutch doors, glass doors, swing-in and swing-out left doors, mirrored doors, pocket doors, swing-in and swing-out right doors, saloon doors, sliding doors, and swing doors.

It is contemplated that the present method can further use textual information and/or graphic images to depict and/or annotate elevators and elevator features, including interior and exterior elevators, elevator guard gates, elevator telephones, and spaces for future elevators.

The textual information and/or graphic images can further depict and/or annotate fireplaces, such as corner fireplaces, double-sided fireplaces, gas log fireplaces, fireplace mantels, fireplace hearths, fireplace screens, and wood burning fireplaces.

The present method can also use textual information and/or graphic images to depict and/or annotate floors and flooring features, materials, and/or textures, such as directional arrows for showing directions or pathways from one room to another, drains, floor plugs, hardwood floors, inset carpets, marble floors, moats, mosaics, parquet floors, sealed garage floors, slate floors, tiles, travertine, and wide plank floors. Textual information and/or graphic images can also depict and/or annotate inlaid wood floors, inlaid stone floors, inlaid tiles floors, and similar types of floors. It is contemplated that graphic images can depict a representation of the actual pattern and/or texture of the floor being depicted. For example, checkered tile patterns, slatted wooden floors, and similar patterns can be shown using graphic images.

The present method can also include textual information and/or graphic images for depicting and/or annotating lighting, such as bathroom vanity strips, coffered ceiling lighting, concealed lighting, cove lighting, directional arrows for showing direction of lighting or wall mounted lamps that swing back against a wall, pendant lighting, reading lamps, sconce lighting, track lighting, and vertical make-up lighting.

The textual information and/or graphic images can also depict and/or annotate plumbing and related fixtures, such as bidets, handheld bidets, claw footed tubs, corner tubs, directional arrows for showing the direction of swinging for pot fillers and shower arms, elevated shaving sinks, garden tubs, jacuzzis, retractable hot and cold taps, showers, shower drains, shower heads, steam rooms, toilets, and whirlpool tubs.

The present method can further include using textual information and/or graphic images to depict and/or annotate porch features, such as arched colonnades, exterior ceiling fans, walled courtyards, covered balconies, covered porches, directional arrows showing entry and exit pathways, glass enclosed porches, loggia, porte cochere, screened porches, and covered walkways.

It is contemplated that the textual information and/or graphic images can further annotate and/or depict shelves, such as adjustable shelves, ceiling level shelves, directional arrows for showing the direction of pull-out shelving or pull-out baskets, interior and exterior display shelves, glass shelves, overhead storage shelves, rafter storage, interior and exterior shelving, wire baskets, wire shelves, and wrap-around shelves.

The present method can further use textual information and/or graphic images to depict and/or annotate sinks, such as six-sided sinks, bathroom basins and sinks, double sinks, elevated shaving sinks, film developing sinks, pedestal sinks, shell-shaped scalloped sinks, single sinks, triple sinks, and vessel sinks.

The textual information and/or graphic images can be used to depict and/or annotate stair features, such as balustrades, banisters, carpeted stairs, directional arrows showing directions to upstairs and to downstairs, hardwood stairs with or without carpet runners, newel posts, steps, spiral stairs, interior and exterior stairs and steps, and under stair storage.

The present method also contemplates using textual information and/or graphic image to depict and/or annotate various types of walls and rooms, such as half walls, archways, art niches, atriums, banquet and reception spaces, basketball courts, brick accent walls, cable outlets, catering kitchens, computer lofts, darkrooms, directional arrows for showing direction or flow from one area to another, electrical outlets, finished garages, floored attic storage, exercise rooms and fitness centers, gallery hallways, glass block walls, hobby and craft rooms, kitchen offices, loft walls, media rooms, mirrored walls, mud rooms, music rooms, natatoriums, overhead lofts, paneled walls, quarters, recessed telephone niches, steam rooms, sunrooms, theatres, tool hooks, trains along ceilings, walls open to ceilings, and workshops.

It is also contemplated that the textual information and/or graphic images can annotate and/or depict windows and window features, such as second tier windows, accent windows, arched windows, bay windows, beveled and leaded glass windows, black-out shades, butted glass windows, casement windows, ceiling height windows, directional arrows for showing the direction of swing for casement and other specialty windows, divided light windows, dormer windows, elevated windows, fanlights, fixed windows, glass block windows, juliet balconies, palladian windows, plant windows, plantation shutters, privacy windows, shutters, sidelights, stained glass, scrolled ironwork windows, transoms, walls of floor to ceiling windows, and window alcoves.

The textual information and/or graphic images can further depict and/or annotate exterior and yard features, such as air conditioner compressors, arbors and pergolas, arched colonnades, automatic watering systems, awnings, balcony flower baskets, bamboo groves, bicycle storage racks, boat slips, brick fire pits, brick walkways, patios, and courtyards, cabanas, children's play sets and forts, circular driveways, coachman's lanterns, container plants, courtyards, covered outdoor stairs, directional arrows for showing directions toward other structures or geographical features, diving boards, dog kennels and dog runs, drains, extended driveway aprons, flagpoles, flagstones, flower beds, flower boxes on windows, exterior post lights, flowering shrubs, stand alone fountains, spillway and bubbler fountains and other fountains in pools, garage storage systems, garden lights and lamp posts, gardener's closets and sheds, garden trellis, gates, gazeboes and pergolas, glass enclosed porches, grassy lawns, golf courses, hedges, hot tubs, mature trees with branching canopies, meandering pathways, mosquito control systems, off-street parking spaces, outdoor grills, outdoor kitchens, outdoor living spaces, outdoor storage sheds, outside showers, overhead lattice arbors, park benches, park-like settings, parking spaces and extra parking, patios and terraces, patio furniture, paved motor courts, paverstones, picket fences, privacy hedges, pocket gardens, ponds and koi ponds, pools, pool bars with swim up barstools, pool decks, pool ladders, pool slides, pool steps, pool tanning shelves, pool equipment and filters, porte cochere, professional landscaping, potting sheds, putting greens, putting green flags, river rock walkways and gardens, roof top patios, shrubs, solariums, spas, sports equipment storage racks, stepping stones, trees, tropical plants and palms, vines trained to trellis, walled gardens, waterfalls in pools, water lilies, wood planked decks and balconies, wrought iron railings, and yard drains.

The present method can further use textual information and/or graphic images to annotate and/or depict outdoor structures, such as an eight-stall horse barn. The textual information and graphic images could depict and/or annotate steel roll-up doors, skid resistant aisle ways, horse stalls, doors to horse stalls, windows in horse stalls, air conditioned powder rooms, toilets, powder room sinks, air conditioned offices, refrigerators, adjustable shelves, air conditioned utility rooms, pegboards, wire shelves, bridle hooks, space for a full-sized washer and dryer, shelves over a washer and dryer, pegboard lined storage lockers, feed storage rooms, pegboards, double doors, horse bathing and grooming stations, exit doors to an arena, and directional arrows indicating orientation toward an adjacent house.

Depiction and/or annotation of ranch structures, equipment, and areas can also include textual information and/or graphic images annotating and/or depicting outdoor riding arenas, grassy turfs, stadium lighting, riding arena fencing, covered and lighted training pens, training pen fencing and gates, horse stocks, washing stations with rubber matting and cross-ties, covered and lighted storage for hay and equipment, vaulted roofs on training pens, outdoor lighted hydraulic horse exercisers, fencing and paddocks for a horse exerciser with a gate, directional arrows showing the direction toward a barn, covered parking for trucks and trailers, outdoor trailer parking, extended driveway aprons, and water pumping stations.

Textual information and/or graphic images can further be used to annotate and/or depict exterior land, such as directional arrows for showing the direction toward other structures or geographical features, roadways, pathways, and walkways between buildings and geographical features, pastures, pasture fencing, pasture shelters, lakes stocked with fish, fishing docks, and trees showing shaded areas of pastures for livestock.

The present method can then include forming a property overview image of the structure and any adjacent outside spaces using computer instructions in the data storage, each measurement taken, one or more of the measurement lines formed, the textual information input, and the graphic images input.

The property overview image is contemplated to be a detailed representation of a property, drawn to scale, depicting any number of recorded features using graphic images, and labeling any number of recorded features using textual information.

The forming of the property overview image can include forming multiple floor plans and outdoor space images, such as forming separate floor plans for multiple floors of a house. A property overview image can also contain multiple nested images which are linked to one another, such as when depicting a large property containing multiple embedded floor plans of one or more areas within the large property, each embedded floor plan depicting one or more areas in greater detail. It is contemplated that a user can select an embedded floor plan, such as by clicking on an area of a property overview image with a mouse, to view a more detailed, nested floor plan of the selected area. The floor plan of the selected area can include links to return to the property overview image of the entire property.

In an embodiment, one or more icons are can be placed on the property overview image. Each icon can be linked to at least one digital image of the space. The icons can be any type of symbol, such as a numbered arrow located at the position on the property overview image where the linked digital image was obtained, and indicating the direction or perspective of the digital image.

Each digital image can be an image of the space from a selected perspective. In an embodiment, one or more digital images can include satellite images of the space.

The digital images can include images of rooms, outside spaces, and areas outside the structure taken from a point within the structure or from an outside space adjacent the structure, such as a view from a balcony of the structure.

The one or more digital images can be photographs, digital photographs, scanned images, virtual tours, or drawings of one or more rooms or outside spaces.

The selected perspective of the digital images can be any view, including a birds-eye view, an elevated view, a frontal view, a top view, a side view, a first person view, or a bottom view.

In a contemplated embodiment, the present method can include obtaining one or more digital images of the space, such as by photographing the space, videoing the space, obtaining one or more satellite images of the space, or combinations thereof.

It is contemplated that by accessing the icons, a user can view the digital images linked to the selected icon. Each digital image can be displayed with textual information describing features of the depicted area. The display including the digital image can include links for returning to the property overview image of the property, or to view a features listing for the part or all of the property.

The present method then includes outputting the property overview image for viewing by one or more users. The outputting can be performed using one or more output devices in direct or remote communication with the processor, such as a computer monitor, a cellular or personal digital assistant display screen, or a printer. The outputting can also include creating a digital file, such as PDF file, and transmitting the file to a user, such as by using e-mail.

It is contemplated that the user can access the property overview image, one or more digital images through one or more icons, and the textual information seamlessly due to the present property presentation and visualization method's compilation of the property overview image. Each display, whether depicting the property overview image of the property, a textual features listing of the property, or a digital image alongside textual features of a depicted area of the property, can include links to allow the user to view any other portion of the property overview image, any digital image, or any textual information that has been input to the processor.

In an embodiment, the present property presentation and visualization method can further include measuring a cabinet length, a cabinet width, and a cabinet height of one or more cabinets to form a cabinet measurement, and inputting the cabinet measurement to the processor. It is contemplated that when measuring one or more suspended or elevated cabinets, a cabinet elevation can also be measured. This embodiment is beneficial when an owner or buyer wishes to know the storage capacity of one or more cabinets, or to determine whether one or more objects or pieces of furniture can be placed beneath one or more elevated cabinets.

The elevation and measurements of other features and amenities, such as shelving, sinks, counters, handicap accessible areas, storage and other features can also be measured and indicated in the property overview image.

The property presentation and visualization method can also include measuring a closet length and a closet width of at least one closet, forming a closet measurement to be input to the processor. The property presentation and visualization method can also include measuring a closet height while measuring the closet length and the closet width.

Any features or characteristics of a closet can also be depicted, such as double and single hanging bars, pull down bars, cabinets, drawers, shelves, accessory hooks, benches, under-bench storage, windows, steaming stations, pants presses, mirrored walls and doors, mirrors, specialized lighting, and skylights.

Other additional spaces such as pantries, stairways, powder rooms, bath rooms, lofts, alcoves, bay windows, bow windows, upper floor landings, attics, under-stair storage areas, and hallways can be measured. By convention, additional spaces such as closets and pantries are generally regarded as features of the room to which they are adjacent, rather than separate rooms, however, it is contemplated that additional spaces could also be measured, labeled, and depicted as separate rooms using the present property presentation and visualization method.

In an embodiment, the property presentation and visualization method can also include locating at least one outlet, which can include electrical outlets, cable outlets, such as Ethernet, Digital Subscriber Line, or Broadband outlets, telephone outlets, and other types of outlets. The location of one or more outlets can be depicted in the property overview image. This embodiment can be useful when an owner or potential buyer is contemplating the arrangement and location of furniture, electrical items, appliances, wiring and cabling, and other contents.

It is contemplated that accessing the one or more icons, such as by using a mouse, a keyboard, a touchpad, or a stylus will allow a user to view each of the digital images, such as on a computer display. It is also contemplated that a display containing a digital image can have one or more icons, buttons, or links that can be accessed to view the property overview image, or view the text information for the entire structure.

The processor can be connected to a network, such as the internet, a local area network, a wireless network, an intranet, a web page, or a portal. It is contemplated that the images produced by the present property presentation and visualization method can be uploaded and stored in a data repository, such as a local or national real estate listing, or presented on one or more internet pages. It is also contemplated that the images produced by the present property presentation and visualization method can be sent via e-mail as a self-contained file, or printed, such as using a printer.

In an embodiment, computer instructions can be used to permit a user to add one or more furniture icons to the property overview image. It is further contemplated that the computer instructions can permit the user to move the furniture icons within the property overview image, rotate the furniture icons, add textual captions to the furniture icons, enlarge or shrink the furniture icons, or delete furniture icons.

This embodiment is contemplated to be especially useful for assisting users with the virtual arrangement and furnishing of a property when contemplating purchase of the property. Users who are able to determine aesthetic locations in which to place furniture that is already owned, and/or determine any pieces of new furniture which may be needed are able to make informed decisions regarding the purchase of a property, and are more likely to purchase a property that provides a property overview image that allows for this virtual arrangement and placement of furniture versus a property that does not.

In an embodiment, the computer instructions are contemplated to also permit the user to add or remove walls from the property overview image, thereby allowing users who are contemplating interior remodeling of a property to virtually simulate the contemplated changes.

It is also contemplated that in an embodiment, computer instructions can be used to allow a user to magnify or shrink the property overview image, which is contemplated to be useful when a user wishes to visualize a portion of the property overview image in greater detail by enlarging the property overview image, or to visualize a larger portion of the property by shrinking the property overview image.

Referring now to FIG. 1, a flow diagram depicting an embodiment of the present method is shown.

The depicted embodiment includes measuring a structure having at least one room with at least one room length and width forming at least one measurement line 516. It is contemplated that a room can have multiple lengths and widths, such as a room having a breakfast nook or a windowed alcove, a room that is non-rectangular, or a room that is not wholly separated from an adjacent room or hallway by walls.

Any number of measurement lines can be formed depending on the number of lengths or widths that can be measured for a room.

The room length and width are then input to a processor having data storage 518.

FIG. 1 then depicts measuring at least one wall interruption for the room having at least one wall interruption length, forming a wall interruption measurement 520. Wall interruptions can include doorways, windows, built-in furniture, and any other features or openings that interrupt a continuous wall. The width, height, elevation, or combinations thereof can also be measured for one or more wall interruptions.

In an embodiment, a room length and room width can include the sum of multiple linear measurements that include wall interruption measurements. For example, a 4-foot length of a room can be measured, which extends from the wall of a room to the beginning of a doorway. The 3-foot width of the doorway can then be measured. The remaining 4-foot length of the room extending from the opposite side of the doorway to the opposite wall can then be measured. The 3 measurements can be summed to determine the 10-foot length of the room. The resulting 10-foot measurement can be depicted as a single measurement line, or as any combination of measurement lines representing any 2 or all 3 of the measurements.

The wall interruption measurements are then input to the processor 522.

At least one outside space adjacent the structure having at least one outside space measurement is measured 524. It is contemplated that an outside space can have any number of measurements, depending on the distances and dimensions that an owner or buyer desires to be measured.

For example, a stretch of farmland can have a length and a width that can be measured, however it is contemplated that other distances within an outside space, such as the distance from a fence within the stretch of farmland to a road boarding the farmland, can also be measured. Measurements between outdoor structures and geographical features can often aid in the depiction and visualization of an outside space to a greater degree than measurements of length and width of large tracts of land.

FIG. 1 then depicts inputting the outside space measurements to the processor 526.

The depicted embodiment then includes inputting textual information and at least one graphic image concerning the structure and outside space to the processor 528.

A property overview image of the structure is then formed using computer instructions, the room length, the room width, the measurement lines, the wall interruption measurement, the outside space measurement, the textual information, and the graphic images 530.

At least one icon is placed on the property overview image 532, which can be any kind of icon or symbol.

Each icon can then be linked to at least one digital image of the structure 534. Each digital image can be viewed alongside textual information relating to the room or outside space depicted in the digital image.

The property overview image is then output for viewing by a user 536, as described previously.

Figure 2:
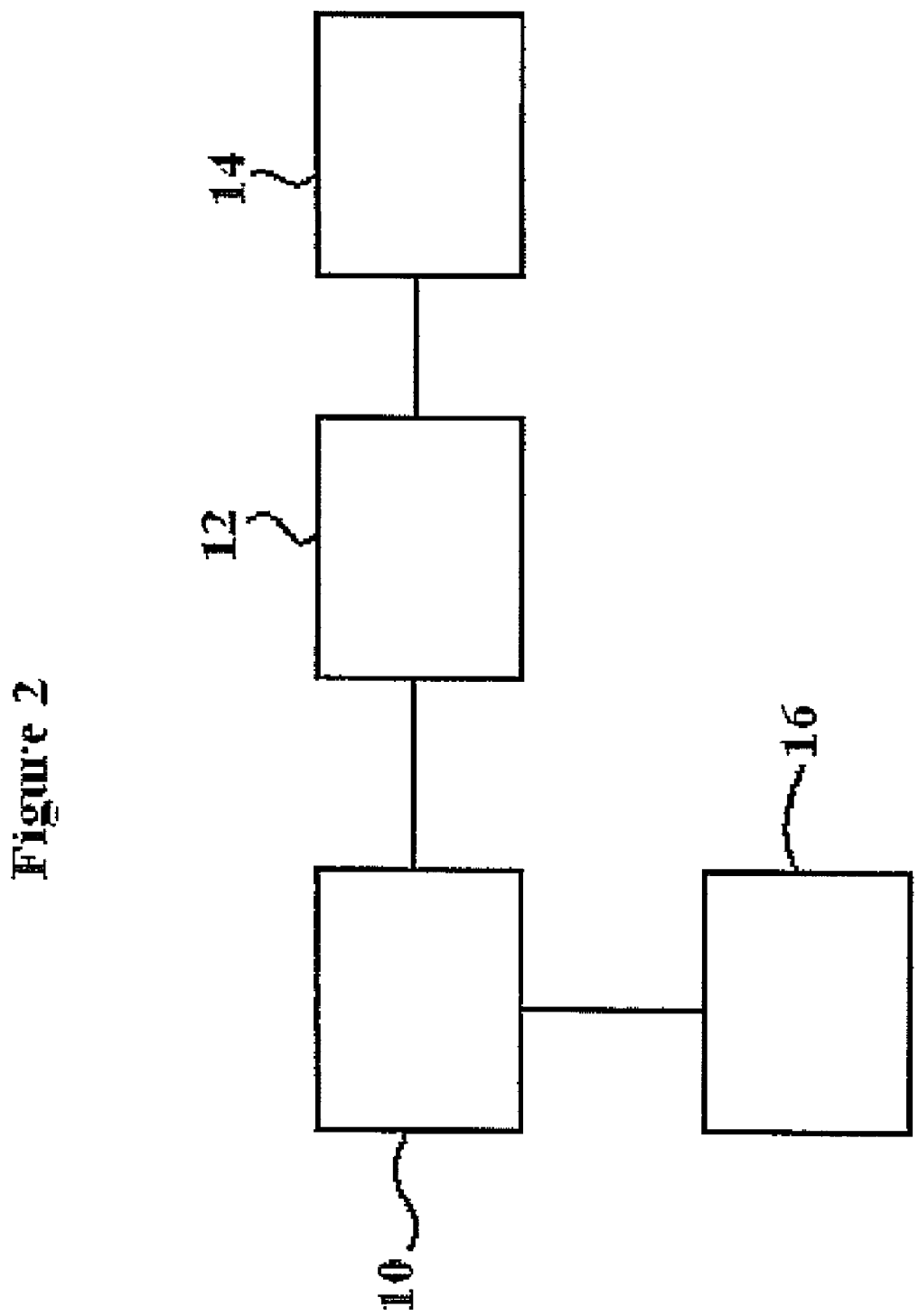
FIG. 2 depicts a diagram displaying the interactions between the computer components of a property presentation and visualization system useable with the present method.

Referring now to FIG. 2, a diagram depicting the interactions between the computer components of a property presentation and visualization system useable with the present method is depicted.

Processor 10 is connected to data storage 12 for processing data, such as measurements and textual information. Processor 10 can be any kind of processor, including that found in a computer. Data storage 12 is adapted to store data, including measurements, structural information, and computer instructions. Data storage 12 can be any kind of data storage medium, such as a computer hard drive, a CD-ROM, a DVD-ROM, a floppy disk, paper, or a removable storage media.

Data storage 12 is connected to an output 14. Output 14 can output images generated from the data stored in data storage 12. Output 14 can be any kind of display or output, including a computer monitor, a cellular telephone display, a personal digital assistant, a television, a printer, other displays, or other outputting means such as a digital file. Output 14 can include a PDF file readable by Adobe Acrobat.

Input device 16 is connected to processor 10, for inputting measurements, textual information, images, and commands into processor 10. Input device 16 can be a keyboard, a mouse, a microphone and voice recognition software, a touch screen, a cellular telephone, a personal digital assistant, or other kinds of input devices.

Figure 3:
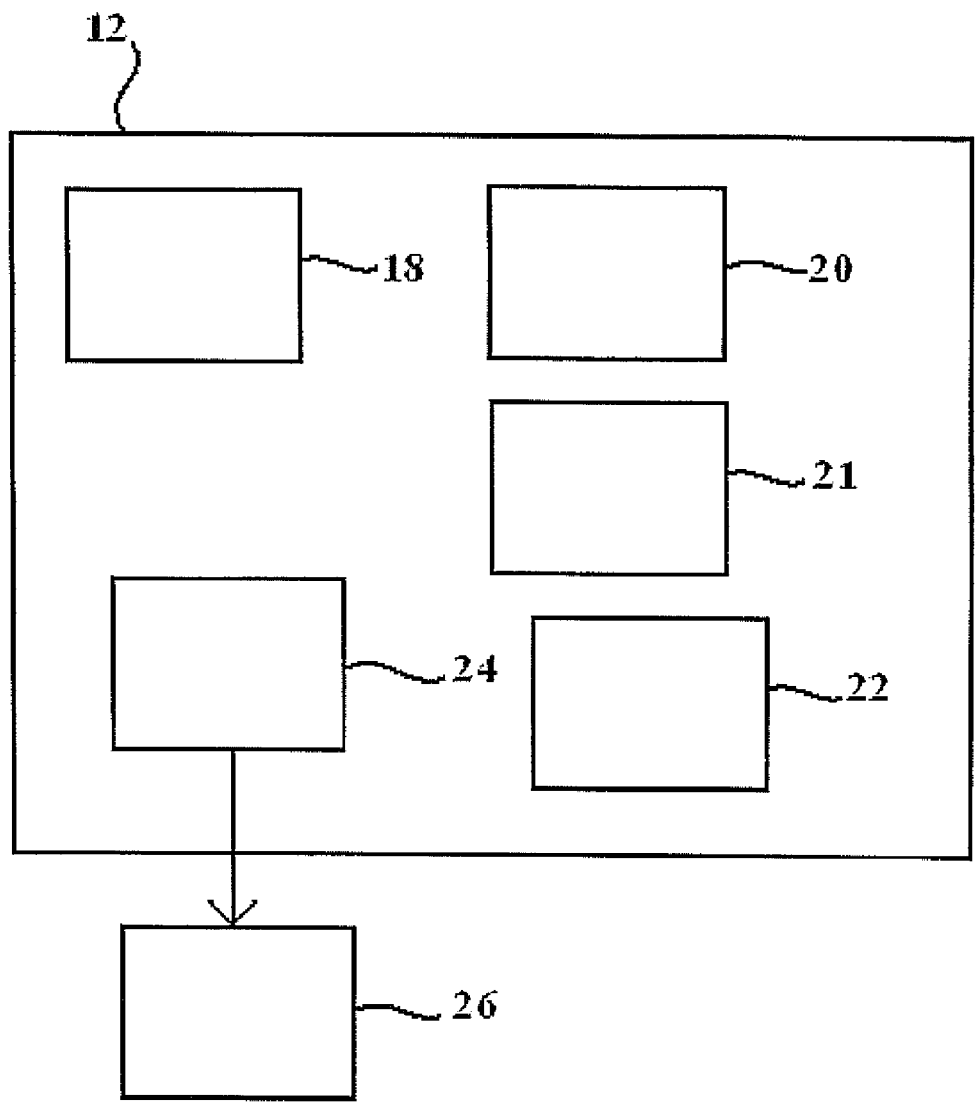
FIG. 3 depicts a diagram displaying the contents of the data storage of the property presentation and visualization system of FIG. 2.

Referring now to FIG. 3, a diagram depicting the contents of the data storage of FIG. 1 is shown.

Data storage 12 contains room measurements 18, outside space measurements 20, wall interruption measurements 21, and related structural information 22, which can include textual information and graphic images.

Data storage 12 also contains computer instructions 24, which are used to generate property overview image 26 using room measurements 18, outside space measurements 20, wall interruption measurements 21, and related structural information 22.

Property overview image 26 is drawn to scale using room measurements 18, outside space measurements 20, and wall interruption measurements 21. Property overview image 26 further contains annotated text, graphic images, and digital images contained within related structural information 22.

Figure 4:
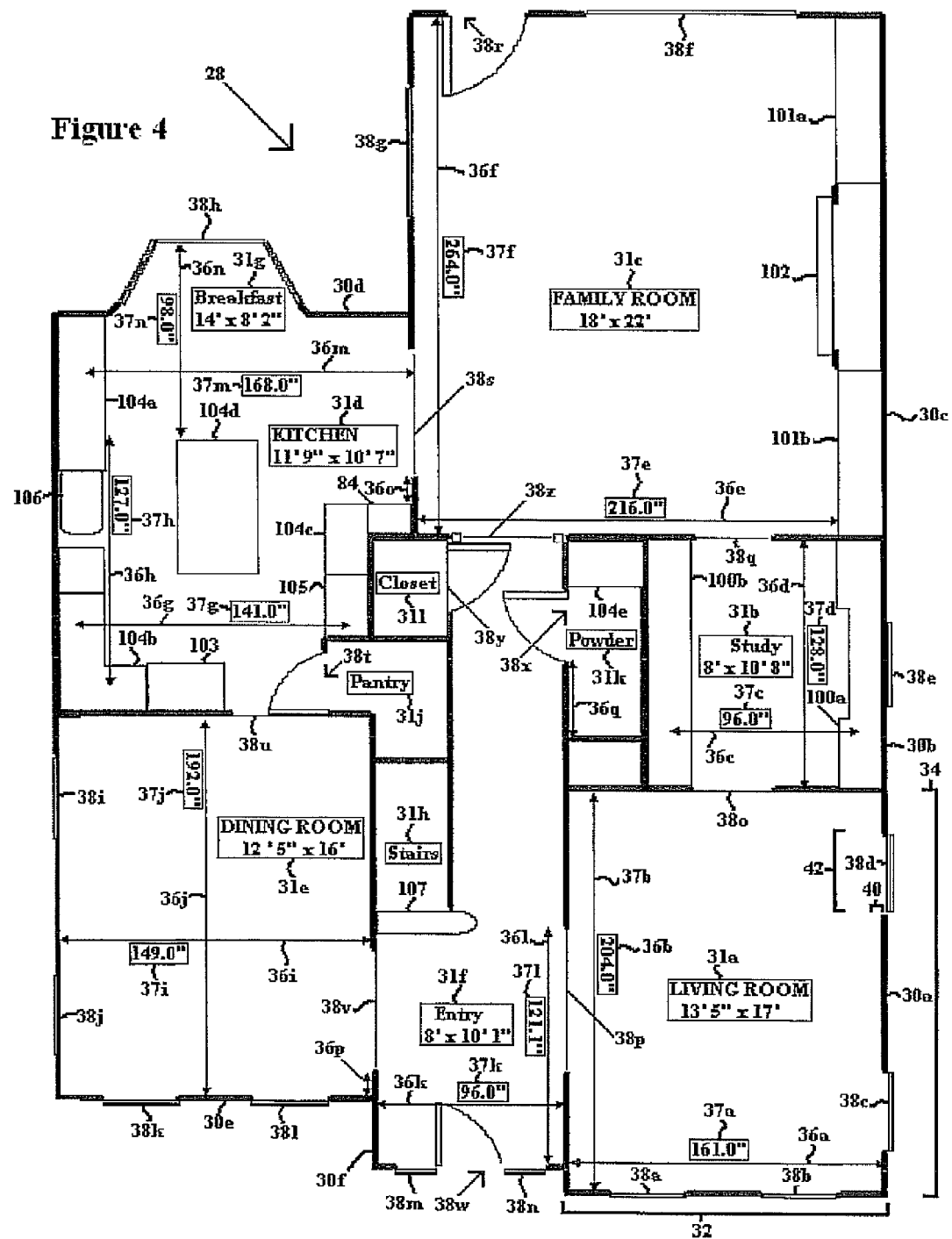
FIG. 4 depicts an embodiment of an image displaying a floor plan of the first floor of a structure containing measurement lines produced using the present method.

Referring now to FIG. 4, an embodiment of a property overview image is depicted. The property overview image depicted in FIG. 4 is an exemplary image produced after measuring a structure and forming measurement lines, but prior to inputting related structural information such as graphic images and icons for linking to digital images in the property overview image. Additional lines to depict some of the features and objects of a room are also included. While the structure depicted in FIG. 4 contains multiple floors, only the first floor has been depicted in FIG. 4 for exemplary purposes.

FIG. 4 depicts a property overview image of structure 28. Structure 28 can be any kind of structure, but is depicted in FIG. 4 as a house. Structure 28 is depicted having six major rooms, first room 30*a*, second room 30*b*, third room 30*c*, fourth room 30*d*, fifth room 30*e*, and sixth room 30*f*.

First room 30*a* has an exemplary room length 32, such as thirteen feet and five inches, and an exemplary room width 34, such as seventeen feet. First room 30*a* has a first room label 31*a*, which identifies the nature of first room 30*a* and differentiates first room 30*a* from other rooms. First room label 31*a* also includes the dimensions of first room 30*a*, such as 13'5"× 17'. By convention, it is contemplated that all dimension notations can be presented uniformly, with a horizontal measurement provided before a vertical measurement. The dimensions included in first room label 31*a* can be rounded to the nearest inch. In an embodiment, all measurements containing fractional inches can be rounded down. It is contemplated that the dimensions included in first room label 31*a* can be in feet and inches, or in other units, such as metric units.

First room 30*a* is also depicted having a first measurement line 36*a*, which represents the length of first room 30*a* and can be located in the property overview image relative to the location at which the on-site measurement being represented was collected. First measurement line label 37*a* indicates the numerical value of the measurement represented by first measurement line 36*a*, such as 161.0". First measurement line label 37*a* is depicted displaying a measurement in inches, though the numerical value of first measurement line label 37*a* can be expressed in any unit, including feet or metric units.

First room 30*a* also has a second measurement line 36*b*, which represents the width of first room 30*a* and can be located in the property overview image relative to the location at which the on-site measurement being represented was collected. Second measurement line label 37*b* indicates the numerical value of the measurement represented by second measurement line 36*b*.

First room 30*a* is also depicted having six wall interruptions, first wall interruption 38*a*, second wall interruption 38*b*, third wall interruption 38*c*, fourth wall interruption 38*d*, fifteenth wall interruption 38*o*, and sixteenth wall interruption 38*p*.

First wall interruption 38*a*, second wall interruption 38*b*, third wall interruption 38*c*, and fourth wall interruption 38*d*, are depicted accommodating windows disposed between first room 30*a* and the exterior of structure 28. Fourth wall interruption 38*d* has an exemplary wall interruption length 40, such as six inches, and an exemplary wall interruption width, such as four feet.

Fifteenth wall interruption 38*o* is depicted as a pass-through opening disposed between first room 30*a* and second room 30*b*. Sixteenth wall interruption is depicted a pass through opening disposed between first room 30*a* and sixth room 30*f*.

Second room 30*b* is depicted having a second room label 31*b*, such as "Study", which identifies the nature of the room and differentiates second room 30*b* from other rooms. Second room label 31*b* also includes the dimensions of second room 30*b*.

Second room 30*b* is also depicted having a first built-in cabinet unit 100*a* and a second built-in cabinet unit 100*b*. It is contemplated that first built-in cabinet unit 100*a* and second built-in cabinet unit 100*b*, while depicted only as rudimentary lines in the property overview image of FIG. 4, can be later modified using graphic images and annotated text information, to better depict the represented features.

Second room 30*b* has a third measurement line 36*c*, which represents the distance between first built-in cabinet unit 100*a* and second built-in cabinet unit 100*b*, and can be located in the property overview image relative to the location at which the on-site measurement being represented was collected. Due to the space occupied by first built-in cabinet unit 100*a* and second built-in cabinet unit 100*b*, third measurement line 36*c* represents only the useable length of second room 30*b*, rather than the full length of second room 30*b*. Third measurement line label 37*c* indicates the numerical value of the measurement represented by third measurement line 36*c*.

Second room 30*b* also has a fourth measurement line 36*d*, which represents the width of second room 30*b* and can be located in the property overview image relative to the location at which the on-site measurement being represented was collected. Fourth measurement line label 37*d* indicates the numerical value of the measurement represented by fourth measurement line 36*d*.

Second room 30*b* has a fifth wall interruption 38*e*, which is depicted accommodating a window disposed between second room 30*b* and the exterior of structure 28. Second room 30*b* also has fifteenth wall interruption 38*o*, depicted as a pass-through opening disposed between second room 30*b* and first room 30*a*. Second room 30*b* further has a seventeenth wall interruption 38*q*, depicted as a pass-through opening disposed between second room 30*b* and third room 30*c*.

Third room 30*c* is depicted having a third room label 31*c*, which identifies the nature of third room 30*c* and differentiates third room 30*c* from other rooms. Third room label 31*c* also includes the dimensions of third room 30*c*.

Third room 30*c* is also depicted having a first built-in cabinet base 101*a*, a second built-in cabinet base 101*b*, and a fireplace 102. It is contemplated that first built-in cabinet base 101*a*, second built-in cabinet base 101*b*, and fireplace 102, while depicted only as rudimentary lines in the property overview image of FIG. 6, can be later modified using graphic images and annotated text information, to better depict the represented features.

Third room 30*c* has a fifth measurement line 36*e*, which represents the distance between second built-in cabinet base 101*b* and an opposing wall and can be located in the property overview image relative to the location at which the on-site measurement being represented was collected. Due to the space occupied by second built-in cabinet base 101*b*, fourth measurement line 36*d* represents only the space between second built-in cabinet base 101*b* and an opposing wall, rather than the full length of third room 30*c*. Fifth measurement line label 37*e* indicates the numerical value of the measurement represented by fifth measurement line 36*e*.

Third room 30*c* also has a sixth measurement 36*f*, which represents the width of third room 30*c*. Sixth measurement line label 37*f* indicates the numerical measurement represented by sixth measurement line 36*f*.

Third room 30*c* is also depicted having a sixth wall interruption 38*f* and a seventh wall interruption 38*g*, which accommodate windows disposed between third room 30*c* and the exterior of structure 28.

Third room 30*c* further has seventeenth wall interruption 38*q*, depicted as a pass-through opening disposed between second room 30*b* and third room 30*c*. Third room 30*c* also has an eighteenth wall interruption 38*r*, which is depicted accommodating a door disposed between third room 30*c* and the exterior of structure 28. Third room 30*c* additionally has a nineteenth wall interruption 38*s*, depicted as a pass-through opening disposed between third room 30*c* and fourth room 30*d*.

Fourth room 30*d* is depicted as an irregularly shaped room having an alcove, such as a breakfast alcove. As such, fourth room 30*d* has two room labels, fourth room label 31*d* and seventh room label 31*g*. Fourth room 30*d* further has two pairs of measurement lines, seventh measurement line 36*g*, eighth measurement line 36*h*, thirteenth measurement line 36*m*, and fourteenth measurement line 36*n*. Thus, fourth room 30*d* has been conceptually divided into two rooms for purposes of measurement and labeling.

Fourth room label 31*d* identifies the nature of fourth room 30*d* and differentiates fourth room 30*d* from other rooms. Fourth room label 31*d* also includes the dimensions of the portion of fourth room 40*d* excluding the alcove. Seventh room label 31*g* identifies the nature of the alcove portion of fourth room 30*d* and includes the dimensions of the alcove portion of fourth room 40*d*.

Fourth room 30*d* has a first counter 104*a*, a second counter 104*b*, and a third counter 104*c*. Fourth room 30*d* further has a fourth counter 104*d*, disposed in the center of fourth room 30*d*. Fourth room 30*d* also has a refrigerator 103, an oven 105, a cabinet 84, and a sink 106. It is contemplated that first counter 104*a*, second counter 104*b*, third counter 104*c*, fourth counter 104*d*, refrigerator 103, oven 105, cabinet 84, and sink 106, while depicted only as rudimentary lines in the property overview image of FIG. 4, can be later modified using graphic images and annotated text information, to better depict the represented features.

Fourth room 30*d* has a seventh measurement line 36*g*, which represents the useable length between second counter 104*b* and oven 105 and can be located in the property overview image relative to the location at which the on-site measurement being represented was collected. Due to the space occupied by second counter 104*b* and oven 105, seventh measurement line 36*g* represents only the useable space between second counter 104*b* and oven 105, rather than the full length of fourth room 30*d*. Seventh measurement line label 37*g* indicates the numerical value of the measurement represented by seventh measurement line 36*g*.

Fourth room 30*d* has an eighth measurement line 36*h*, which represents the distance between second counter 104*b* and the opposite edge of fourth counter 104*d*. Fourteenth measurement line 36*n* represents the distance between fourth counter 104*d* and the opposing wall of fourth room 30*d*. Thus, eighth measurement line 36h and fourteenth measurement line 36n comprise the full width of fourth room 30d, though fourth room 30d has been conceptually separated by fourth counter 104d, creating two rooms for measurement purposes.

Eighth measurement line label 37h indicates the numerical value of the measurement represented by eight measurement line 36h. Fourteenth measurement line label 37n indicates the numerical value of the measurement represented by fourteenth measurement line 36n.

Fourth room 30d also has a thirteenth measurement line 36m, which represents the useable length between first counter 104a and an opposing wall and can be located in the property overview image relative to the location at which the on-site measurement being represented was collected. Due to the space occupied by first counter 104a, thirteenth measurement line 36m represents only the useable length between first counter 104a and an opposing wall, rather than the full length of fourth room 30d. Thirteenth measurement line label 37m indicates the numerical value of the measurement represented by thirteenth measurement line 36.

Fourth room 30d has an eighth wall interruption 38h, which is depicted accommodating three windows surrounding an alcove, disposed between fourth room 30d and the exterior of structure 28.

Fourth room 30d also has a nineteenth wall interruption 38s, which is depicted accommodating a pass-through opening disposed between third room 30c and fourth room 30d. Fourth room 30d further has a fifteenth measurement line 36o, which represents a measurement for the distance between cabinet 84 and nineteenth wall interruption 38s. A measurement such as that represented by fifteenth measurement line 36o is useful, such as when a potential purchaser wishes to know whether a piece of furniture or another item can be placed along a wall without impacting adjacent features or obstructing adjacent openings such as nineteenth wall interruption 38s.

Fourth room 30d further has a twentieth wall interruption 38t, which is depicted accommodating a door disposed between fourth room 30d and an additional space, such as a closet, a pantry, a powder room, or a stairway. Tenth room label 31j labels and identifies the nature of the additional space adjacent to fourth room 30d.

Fourth room 30d also has a twenty-first wall interruption 38u, which is depicted accommodating a pass-through opening disposed between fourth room 30d and fifth room 30e.

Fifth room 30e has a fifth room label 31e, which identifies the nature of fifth room 30e and differentiates fifth room 30e from other rooms. Fifth room label 31e also includes the dimensions of fifth room 30e.

Fifth room 30e has a ninth measurement line 36i, which represents the length of fifth room 30e and can be located in the property overview image relative to the location at which the represented measurement was collected. Ninth measurement line label 37i indicates the numerical value of the measurement represented by ninth measurement line 36i.

Fifth room 30e further has a tenth measurement line 36j, which represents the width of fifth room 30e and can be located in the property overview image relative to the location at which the represented measurement was collected. Tenth measurement line label 37j indicates the numerical value of the measurement represented by tenth measurement line 36j.

Fifth room 30e also has a ninth wall interruption 38i, a tenth wall interruption 38j, an eleventh wall interruption 38k, and a twelfth wall interruption 38l. Ninth wall interruption 38i, tenth wall interruption 38j, eleventh wall interruption 38k, and twelfth wall interruption 38l are each depicted accommodating a window disposed between fifth room 30e and the exterior of structure 28.

Fifth room 30e also has twenty-first wall interruption 38u, depicted as a pass-through opening disposed between fourth room 30d and fifth room 30e. Fifth room 30e further has a twenty-second wall interruption 38v, depicted as a pass through opening disposed between fifth room 30e and sixth room 30f. A sixteenth measurement line 36p is also depicted in fifth room 30e, representing a measurement collected for the distance between twenty-second wall interruption 38v and an adjacent perpendicular wall of fifth room 30e.

Sixth room 30f has a sixth room label 31f, which indicates the nature of sixth room 30f and differentiates sixth room 30f from other rooms. Sixth room label 31f also includes the dimensions of sixth room 30f.

Sixth room 30f also has a stair tread 107, depicted between sixth room 30f and an adjacent space. Eighth room label 31h indicates the nature of the adjacent space as "Stairs."

Sixth room 30f has an eleventh measurement line 36k, which represents the length of sixth room 30f and can be located in the property overview image relative to the location at which the on-site measurement was collected. Eleventh measurement line label 37k indicates the numerical value of the measurement represented by eleventh measurement line 36k.

Sixth room 30f further has a twelfth measurement line 36l, which represents the distance from stair tread 107 to an opposing wall. Sixth room 30f has been conceptually separated for measurement and labeling purposes, such that the space beyond stair tread 107 is not represented by twelfth measurement line 36l. It is contemplated that multiple measurement lines can be collected, representing various room widths, allowing a single measurement line to be selectively displayed in a property overview image as the representative measurement for a room that has been conceptually separated.

Twelfth measurement line label 37l indicates the numerical value of the measurement represented by twelfth measurement line 36l.

Sixth room 30f has a thirteenth wall interruption 38m, and a fourteenth wall interruption 38n, each of which is depicted accommodating a window disposed between sixth room 30f and the exterior of structure 28. Sixth room 30f also has a twenty-third wall interruption 38w, which is depicted accommodating a door disposed between sixth room 30f and the exterior of structure 28.

Sixth room 30f has twenty-second wall interruption 38v, depicted accommodating a pass-through opening disposed between fifth room 30e and sixth room 30f. Sixth room 30f further has sixteenth wall interruption 38p, depicted accommodating a pass through opening disposed between first room 30a and sixth room 30f. Sixth room 30f also has wall interruption 38z, depicted as a pass through opening disposed between third room 30c and sixth room 30f.

Sixth room 30f has a twenty-fourth wall interruption 38x, depicted accommodating a door disposed between sixth room 30f and an additional space, having a fifth counter 104e and a seventh measurement line 36q which represents the distance between wall interruption 38x and an adjacent perpendicular wall. Eleventh room label 31k indicates the nature of this additional space.

Sixth room 30f also has a twenty-fifth wall interruption 38y, depicted accommodating a door disposed between sixth room 30f and an adjacent space. Twelfth room label 31l indicates the nature of this additional space.

Figure 5:
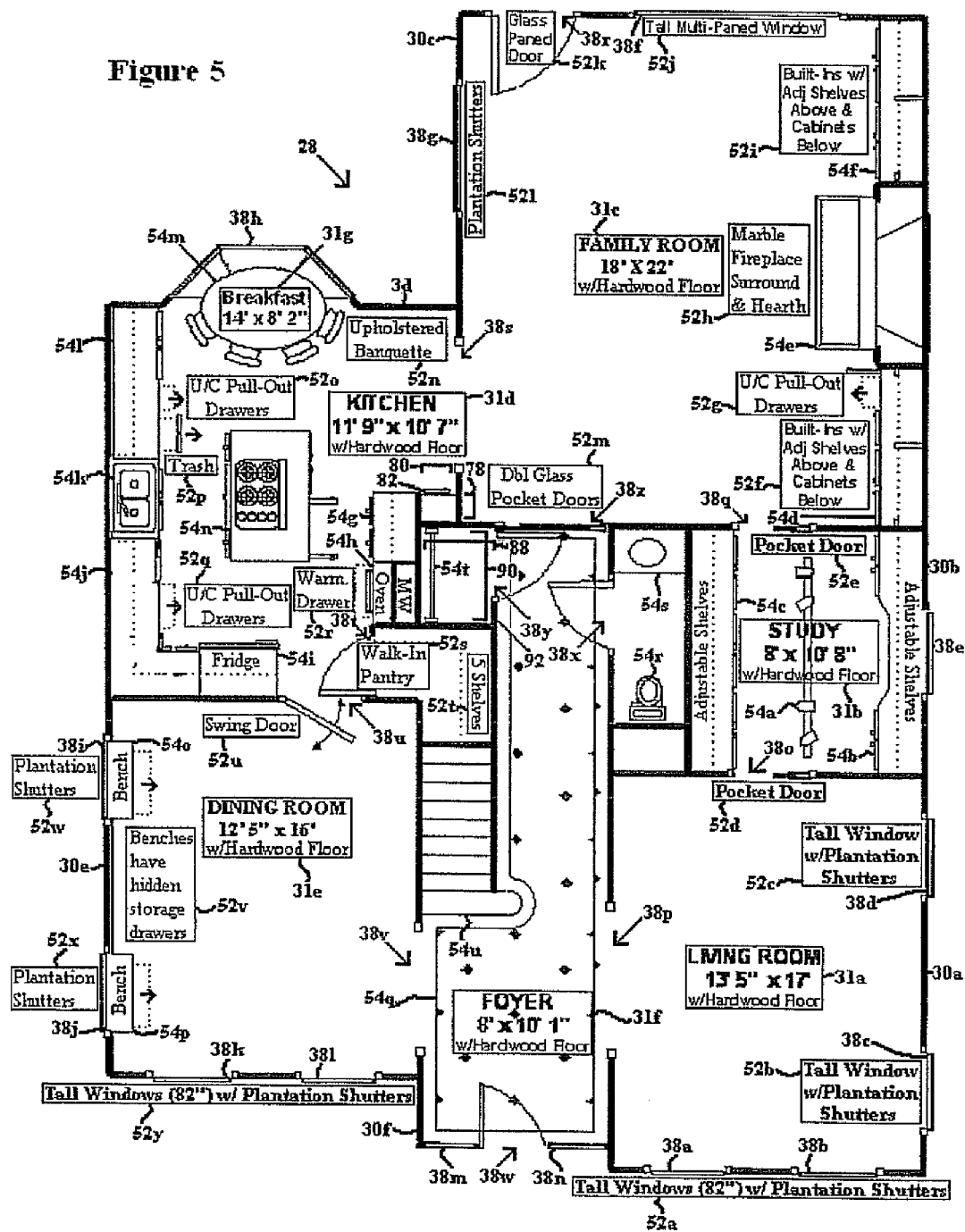
FIG. 5 depicts an embodiment of an image displaying a floor plan of the first floor of a structure containing graphic images and icons produced using the present method.

Referring now to FIG. 5, an embodiment of a portion of a property overview image is depicted. FIG. 5 depicts a portion of an exemplary image produced after measuring a structure, inputting some related structural information such as graphic images and annotated text information, but before adding icons for linking to digital images. The portion of the image depicted in FIG. 5 is depicted in its entirety in FIG. 6. The portion of the image depicted in FIG. 5 depicts an enlarged view of the first floor of structure 28.

Structure 28 has six major rooms, first room 30a, second room 30b, third room 30c, fourth room 30d, fifth room 30e, and sixth room 30f.

First room 30a has a first room label 31a. First room label 31a identifies first room 30a and differentiates first room 30a from other rooms. First room label 31a further includes the dimensions of first room 30a, and also includes additional text describing features of first room 30a, such as "Hardwood Floor."

First room 30a has first wall interruption 38a, and a second wall interruption 38b, each of which is depicted accommodating a window disposed between first room 30a and the exterior of structure 28. First text information 52a describes the windows accommodated by first wall interruption 38a and second wall interruption 38b using annotated text, such as "Tall Windows (82") w/Plantation Shutters."

First room 30a also has third wall interruption 30c, which is depicted accommodating a window disposed between first room 30a and the exterior of structure 28. Second text information 52b describes the window accommodated by third wall interruption 30c. First room 30a further has fourth wall interruption 30d, depicted accommodating a window disposed between first room 30a and the exterior of structure 28. Third text information 52c describes the window accommodated by fourth wall interruption 30d.

First room also has fifteenth wall interruption 38o, which is depicted accommodating a pocket door disposed between first room 30a and second room 30b. Fourth text information 52d describes the door accommodated by fifteenth wall interruption 38o.

First room additionally has sixteenth wall interruption 38p, which is depicted accommodating a cased opening disposed between first room 30a and sixth room 30f.

Second room 30b has a second room label 31b, which identifies the nature of second room 30b and differentiates second room 30b from other rooms. Second room label 31b further includes the dimensions of second room 30b, and also includes additional text describing one or more features of second room 30b, such as "Hardwood Floor."

Second room 30b is depicted having first graphic image 54a, which represents a track lighting strip. While text information could be included to describe or identify graphic image 54a and similar graphic images, graphic image 54a is an easily recognized depiction and can be presented and recognized by a user without text information.

Second room 30b also has second graphic image 54b and third graphic image 54c. Second graphic image 54b and third graphic image 54c represent floor to ceiling built-in units having cabinet bases, drawers, and adjustable shelving. Second graphic image 54b and third graphic image 54c correspond to first built-in cabinet unit 100a and second adjustable cabinet unit 100b, respectively, depicted in FIG. 4. Second graphic image 54b and third graphic image 54c include lines depicting adjustable shelving, cabinets, and cabinet pulls, and annotated text information identifying the adjustable shelves.

Second room 30b has wall interruption 38e, depicted accommodating a window. Second room 30b further has fifteenth wall interruption 38o, depicted accommodating a pocket door. Fourth text information 52d describes the door accommodated by fifteenth wall interruption 38o. Second room 30b additionally has seventeenth wall interruption 38q, depicted accommodating a pocket door. Fifth text information 52e describes the door accommodated by sixteenth wall interruption 38q.

Third room 30c has a third room label 31c. Third room label 31c identifies third room 30c and differentiates third room 30c from other rooms. Third room label 31c also includes text indicating the dimensions of third room 30c and text describing one or more features of third room 30c, such as "Hardwood Floor."

Third room 30c is also depicted having a fourth graphic image 54d and a sixth graphic image 54f, which represent built-in shelves with cabinets. Fourth graphic image 54d and sixth graphic image 54f correspond to second built-in cabinet base 101b and first built-in cabinet base 101a, respectively, depicted in FIG. 4.

Fourth graphic image 54d and sixth graphic image 54f include lines depicting shelving, cabinets, and cabinet pulls. Fourth graphic image 54d further includes lines depicting under-counter pull-out drawers. Sixth text information 52f identifies and describes the built-in shelving and cabinetry represented by fourth graphic image 54d. Seventh text information 52g identifies and describes the under-counter pull-out drawers represented by fourth graphic image 54d. Ninth text information 52i identifies and describes the shelving and cabinetry represented by sixth graphic image 54f.

Third room 30c also has a fifth graphic image 54e, which represents a fireplace surround and hearth, the hearth being framed into the floor. Fifth graphic image 54e corresponds to fireplace 102, depicted in FIG. 4. Fifth graphic image 54e includes lines depicting a fireplace surround, a hearth, and depicting the framing of the hearth. Eighth text information 52h identifies and describes the fireplace surround, hearth, and framing represented by fifth graphic image 54e.

Third room 30c further has sixth wall interruption 38f, which is depicted accommodating a tall multi-paned window disposed between third room 30c and the exterior of structure 28. Tenth text information 52j identifies and describes the window accommodated by sixth wall interruption 38f.

Third room 30c also has seventh wall interruption 38g, which is depicted accommodating a window disposed between third room 30c and the exterior of structure 28. Twelfth text information 52l further describes the window accommodating seventh wall interruption 38g with annotated text, such as "Plantation Shutters."

Third room 30c has seventeenth wall interruption 38q, which is depicted accommodating a pocket door disposed between second room 30b and third room 30c. Fifth text information 52e identifies and describes the door accommodated by seventeenth wall interruption 38q.

Third room 30c additionally has eighteenth wall interruption 38r, which is depicted accommodating a glass paned door disposed between third room 30c and the exterior of structure 28. Eleventh text information 52k identifies and describes the door accommodated by eighteenth wall interruption 38r.

Third room 30c has nineteenth wall interruption 38s, depicted accommodating a cased opening disposed between third room 30c and fourth room 30d. Third room 30c also has twenty-sixth wall interruption 38z, depicted accommodating double glass pocket doors disposed between third room 30c and sixth room 30f. Thirteenth text information 52m identifies and describes the doors accommodated by twenty-sixth wall interruption 38z.

Fourth room 30d is a non-rectangular room, having an alcove, such as a breakfast alcove. Fourth room 30d has been conceptually divided into two rooms for measurement purposes and has two room labels, fourth room label 31d and seventh room label 31g.

Fourth room label 31d identifies the nature of fourth room 30d and differentiates fourth room 30d from other rooms. Fourth room label 31d further includes text indicating the dimensions of fourth room 30d and text describing one or more features of fourth room 30d, such as "Hardwood Floor."

Seventh room label 31g identifies the nature of the alcove disposed in fourth room 30d and includes text indicating the dimensions of the alcove disposed in fourth room 30d.

Fourth room 30d has a cabinet 82, which is depicted having a cabinet pull. Cabinet 82 has a cabinet length 78 and a cabinet width 80.

Fourth room 30d has seventh graphic image 54g, which represents a counter with drawers. Seventh graphic image 54g corresponds to third counter 104c, depicted in FIG. 4. Seventh graphic image 54g includes lines depicting shelving, counter space, drawers, and drawer pulls.

Fourth room 30d has eighth graphic image 54h, which represents an oven. Eighth graphic image 54h corresponds to oven 105, depicted in FIG. 6. Eighth graphic image 54h includes lines depicting a microwave, an oven, oven door, and a warming drawer, and annotated text identifying the microwave, such as "MW," and the oven. Eighteenth text information 52r identifies and describes the warming drawer depicted in eighth graphic image 54h.

Fourth room 30d has ninth graphic image 54i, which represents a refrigerator. Ninth graphic image 54i corresponds to refrigerator 103, depicted in FIG. 6. Ninth graphic image 54i includes lines depicting a refrigerator and annotated text information identifying the refrigerator, such as "Fridge."

Fourth room 30d further has tenth graphic image 54j and twelfth graphic image 54l, which represent counters. Tenth graphic image 54j and twelfth graphic image 54l correspond to second counter 104b and first counter 104a, respectively, depicted in FIG. 4.

Tenth graphic image 54j and twelfth graphic image 54l include lines depicting shelving, counter space, cabinetry, cabinet pulls, drawers, drawer pulls, and under-counter pull-out drawers. Twelfth graphic image 54l also includes lines depicting an under-counter pull-out trash slide. Seventeenth text information 52q identifies and describes the under-counter pull-out drawers represented in tenth graphic image 54j. Sixteenth text information 52p identifies and describes the under-counter pull-out trash slide represented in twelfth graphic image 54l. Fifteenth text information 52o identifies and describes the under-counter pull-out drawers represented in twelfth graphic image 54l.

Fourth room 30d also has thirteenth graphic image 54m, which represents a table and chairs adjacent to built-in bench seating within the alcove. Fourteenth text information 52n identifies and describes the table, chairs, and built-in seating represented by thirteenth graphic image 54m with annotated text information, such as "Upholstered Banquette."

Fourth room 30d further has fourteenth graphic image 54n, which represents a free-standing kitchen island having a cook top. Fourteenth graphic image 54n corresponds to fourth counter 104d, depicted in FIG. 4. Fourteenth graphic image 54n has lines depicting cabinetry, drawers, cabinet pulls, drawer pulls, and a graphic depiction of a cook top.

Fourth room 30d has eighth wall interruption 38h, which is depicted accommodating three windows surrounding an alcove, disposed between fourth room 30d and the exterior of structure 28. Fourth room 30d also has nineteenth wall interruption 38s, depicted accommodating a cased opening disposed between third room 30c and fourth room 30d.

Fourth room 30d further has twentieth wall interruption 38t, depicted accommodating a door disposed between fourth room 30d and an additional space. Nineteenth text information 52s identifies and describes the additional space with annotated text, such as "Walk-In Pantry." Twentieth text information 52t identifies and describes one or more features of the additional space identified and described by nineteenth text information 52s, using annotated text, such as "5 Shelves."

Fourth room 30d additionally has twenty-first wall interruption 38u, which is depicted accommodating a swing door disposed between fourth room 30d and fifth room 30e. Twenty-first text information 52u identifies and describes the door accommodated by twenty-first wall interruption 38u.

Fifth room 30e has a fifth room label 31e, which identifies the nature of fifth room 30e and differentiates fifth room 30e from other rooms. Fifth room label 31e also includes text indicating the dimensions of fifth room 30e and text identifying and describing one or more features of fifth room 30e, such as "Hardwood Floor."

Fifth room 30e has fifteenth graphic image 54o and sixteenth graphic image 54p, which represent benches having storage drawers. Fifteenth graphic image 54o and sixteenth graphic image 54p include lines depicting benches and storage drawers, and annotated text identifying the benches depicted by fifteenth graphic image 54o and sixteenth graphic image 54p.

Twenty-second text information 52v identifies and further describes the storage drawers represented by fifteenth graphic image 54o and sixteenth graphic image 54p.

Fifth room 30e also has ninth wall interruption 38i and tenth wall interruption 38j, which are each depicted accommodating a window disposed between fifth room 30e and the exterior of structure 28. Twenty-third text information 52w further describes the window accommodated by ninth wall interruption 38i with annotated text, such as "Plantation Shutters." Twenty-fourth text information 52x similarly describes the window accommodated by tenth wall interruption 38j.

Fifth room 30e further has eleventh wall interruption 38k and twelfth wall interruption 38l, which are each depicted accommodating a window disposed between fifth room 30e and the exterior of structure 28. Twenty-fifth text information 52y further describes the windows accommodated by eleventh wall interruption 38k and twelfth wall interruption 38l with annotated text, such as "Tall Windows (82") w/Plantation Shutters."

Fifth room 30e additionally has twenty-first wall interruption 38u, which is depicted accommodating a swing door disposed between fourth room 30d and fifth room 30e. Twenty-first text information 52u identifies and describes the door accommodated by twenty-first wall interruption 38u.

Fifth room 30e has twenty-second wall interruption 38v, which is depicted accommodating a cased opening disposed between fifth room 30e and sixth room 30f.

Sixth room 30f has a sixth room label 31f, which identifies the nature of sixth room 30f and differentiates sixth room 30f from other rooms. Sixth room label 31f further has text indicating the dimensions of sixth room 30f and text describing one or more features of sixth room 30f, such as "Hardwood Floor."

Sixth room 30f is depicted having a seventeenth graphic image 54q, which represents a patterned or textured floor. Sixth room 30f is also depicted having a twenty-first graphic image 54u, which represents a stairway. Twenty-first graphic image 54u corresponds to stair tread 107 and eighth room label 31*h*, depicted in FIG. 4. Twenty-first graphic image 54*u* also depicts the design and relation of the border of the flooring represented by seventeenth graphic image 54*q* to the stair tread represented by twenty-first graphic image 54*u*. The contrasting inlaid wood border of the hardwood floor represented by seventeenth graphic image 54*q* is shown encircling the arc shape of the bottom stair tread represented in twenty-first graphic image 54*u*.

Sixth room 30*f* has thirteenth wall interruption 38*m* and fourteenth wall interruption 38*n*, which are each depicted accommodating a window disposed between sixth room 30*f* and the exterior of structure 28. Sixth room 30*f* also has twenty-third wall interruption 38*w*, which is depicted accommodating a door disposed between sixth room 30*f* and the exterior of structure 28.

Sixth room 30*f* has twenty-fourth wall interruption 38*x*, which is depicted accommodating a door disposed between sixth room 30*f* and an additional space having eighteenth graphic image 54*r* and nineteenth graphic image 54*s*. Eighteenth graphic image 54*r* represents a toilet. Nineteenth graphic image 54*s* represents a sink and counter. Nineteenth graphic image 54*s* corresponds to fifth counter 104*e*, depicted in FIG. 4.

Sixth room 30*f* has twenty-fifth wall interruption 38*y*, which is depicted accommodating a door disposed between sixth room 30*f* and a closet 92. Closet 92 has a closet length 88 and a closet width 90. Closet 92 also has twentieth graphic image 54*t*, which represents a closet bar for hanging clothing.

Sixth room 30*f* also has twenty-sixth wall interruption 38*z*, which is depicted accommodating double glass pocket doors disposed between third room 30*c* and sixth room 30*f*. Thirteenth text information 52*m* describes the doors accommodated by twenty-sixth wall interruption 38*z*.

Figure 6:
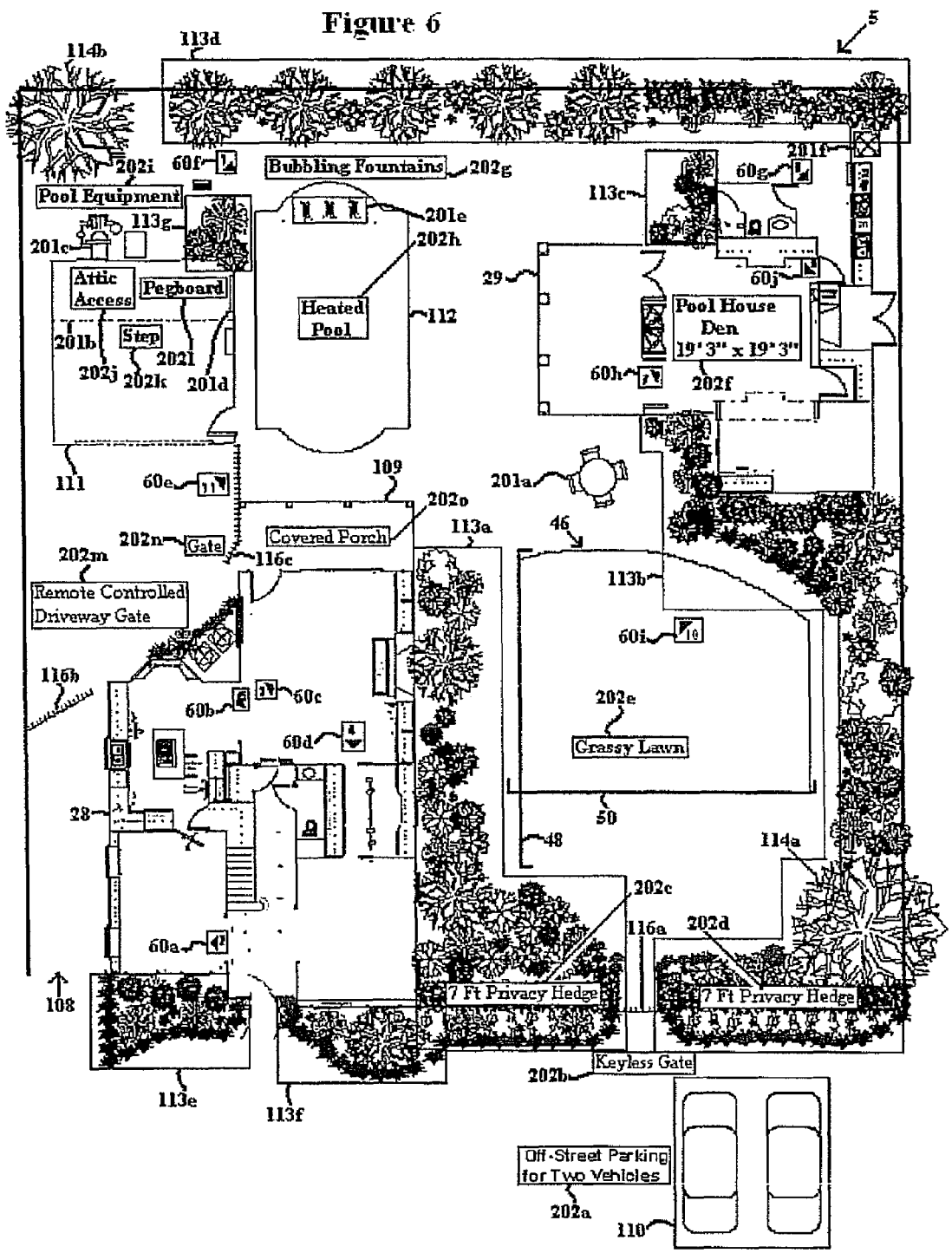
FIG. 6 depicts an embodiment of the image displayed in FIG. 5, further depicting both the first floor of the structure and the outside space adjacent to the structure.

Referring now to FIG. 6, an embodiment of a property overview image is depicted, which includes not only the first floor of structure 28, but also multiple outside spaces. It is contemplated that a user will be able to magnify and reduce the property overview image as needed, such as using computer software such as Adobe Acrobat, to view the detail depicted by FIG. 5 that is not depicted in FIG. 6.

FIG. 6 depicts a property 5, on which structure 28 is located. FIG. 6 depicts the first floor of structure 28 and numerous outside spaces adjacent to structure 28, including outside space 46, which is a grassy lawn, second structure 29, which is a pool house, pool 112, garage 111, driveway 108, covered porch 109, and off-street parking 110.

Structure 28 includes all of the text information, graphic images, room labels, and wall interruptions depicted in FIG. 5, which can be viewed by a user through enlarging the image depicted in FIG. 6. It is contemplated that the property overview image depicted in FIG. 5 can be nested within the property overview image of FIG. 6, such that a user can link to the property overview image of FIG. 5 by selecting a link within the property overview image of FIG. 6.

Structure 28 includes four icons, first icon 60*a*, second icon 60*b*, third icon 60*c*, and fourth icon 60*d*.

First icon 60*a*, second icon 60*b*, third icon 60*c*, and fourth icon 60*d* can be any shape or size, and can include any character or symbol. FIG. 6 depicts first icon 60*a*, second icon 60*b*, third icon 60*c*, and fourth icon 60*d* as triangles labeled with a numeral. First icon 60*a*, second icon 60*b*, third icon 60*c*, and fourth icon 60*d* can be located in the property overview image relative to the location in which a digital image, such as a photograph, was taken. Further, first icon 60*a*, second icon 60*b*, third icon 60*c*, and fourth icon 60*d* can also indicate the direction and perspective of the digital image represented by the respective icon, such as by including a triangle which points in the direction in which the digital image was taken.

Figure 7:
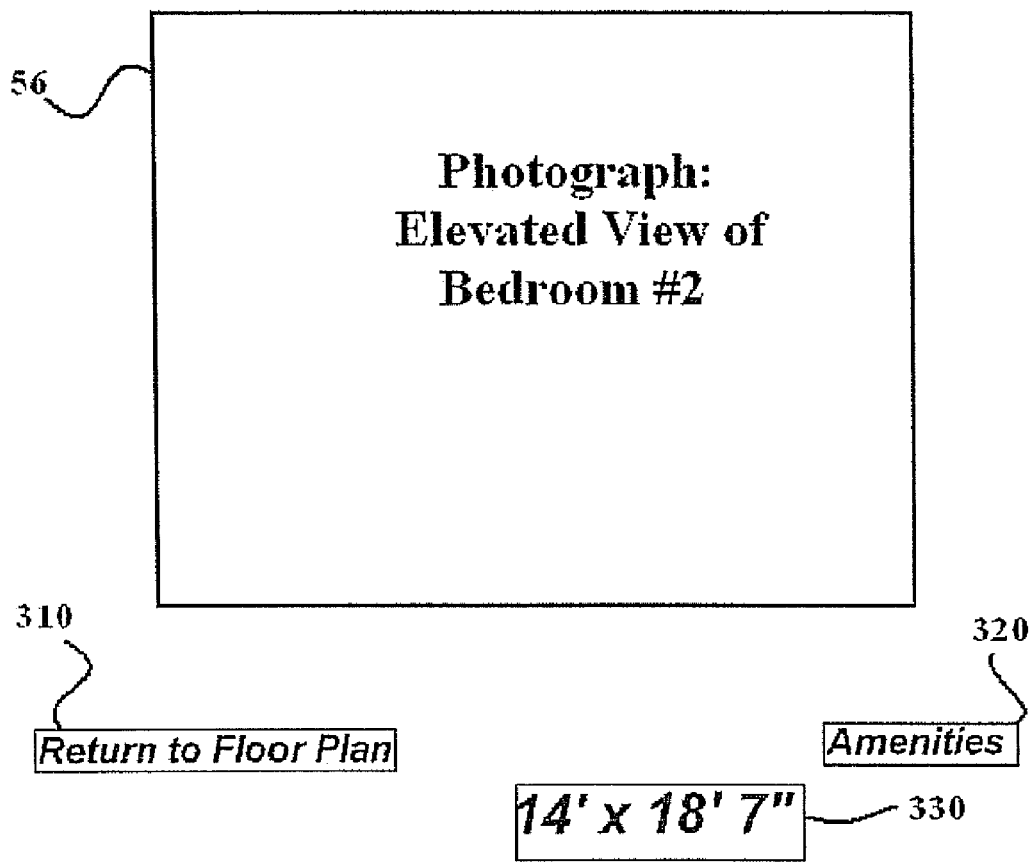
FIG. 7 depicts an embodiment of a display showing a digital image of part of a structure and text information relating to that part of the structure.

It is contemplated that a user can access first icon 60*a*, second icon 60*b*, third icon 60*c*, and fourth icon 60*d*, such as by using a mouse, a keyboard, a touchpad, or a stylus to view the digital image represented by the respective icon in a display similar to that depicted in FIG. 7.

FIG. 6 depicts fifth landscape image 113*e* and sixth landscape image 113*f* disposed adjacent to structure 28. Fifth landscape image 113*e* and sixth landscape image 113*f* are graphic images including lines and shapes to depict and represent bushes, shrubs, grasses, and other plants. Fifth landscape image 113*e* and sixth landscape image 113*f* can accurately depict the shape, dimensions, and contents of the represented landscape features, including the type of foliage, the positioning of major and minor plantings such as hedges and trees, and the arrangement of various plants.

Driveway 108 is also disposed adjacent to structure 28. Driveway 108 has a second gate 116*b*. Second gate 116*b* is a graphic image including lines depicting a gate. Thirteenth text information 202*m* describes second gate 116*b* with annotated text, such as "Remote Controlled Driveway Gate." Covered porch 109 is also disposed adjacent to structure 28. Fifteenth text information 202*o* identifies and describes covered porch 109.

Third gate 116*c* is disposed adjacent to covered porch 109. Third gate 116*c* is a graphic image including lines depicting a gate and an attached fence. Fourteenth text information 202*n* identifies and describes third gate 116*c*.

Outside space 46 is disposed adjacent to structure 28 within property 5. Outside space 46 represents a grassy lawn. Outside space 46 has an outside space length 48 and an outside space width 50. Fifth text information 202*e* identifies and describes outside space 46 with annotated text, such as "Grassy Lawn."

First landscape image 113*a* and second landscape image 113*b* are disposed adjacent to outside space 46. First landscape image 113*d* and second landscape image 113*b* are graphic images that include shapes and lines depicting bushes, grasses, shrubs, a privacy hedge, and other plants. Second landscape image 113*b* further includes a first tree 114*a*, which is a graphic image including lines depicting branches and a trunk.

Third text information 202*c* identifies and describes the privacy hedge depicted by first landscape image 113*a* with annotated text, such as "7 Ft Privacy Hedge." Fourth text information 202*d* similarly identifies and describes the privacy hedge depicted by second landscape image 113*b*.

Outside space 46 has a ninth icon 60*i*, which can be any shape or size and any character or symbol. Ninth icon 60*i* is depicted as a triangle with a numerical label. Ninth icon 60*i* represents a digital image. It is contemplated that ninth icon 60*i* can be located in the property overview image relative to the location in property 5 where the represented digital image was taken. Ninth icon 60*i* can also indicate the direction and perspective of the represented digital image, such as including a triangle which points in the direction in which the digital image was taken.

It is contemplated that accessing ninth icon 60*i*, such as by using a keyboard, a mouse, a touchpad, or a stylus will cause the digital image represented by ninth icon 60*i* to be displayed, such as in a display similar to that shown in FIG. 7.

First graphic image 201*a* is disposed adjacent to outside space 46. First graphic image 201*a* represents a table and chairs and includes lines and shapes to depict the table and chairs.

FIG. 6 also depicts a second structure 29, disposed on property 5 adjacent to outside space 46. Second structure 29 is depicted as a pool house. It is contemplated that second structure 29 can include text information, graphic images, room labels, wall interruptions, and other features such as those present in structure 28, depicted in FIG. 5. A user can magnify the image depicted in FIG. 8 to better view the detail present in second structure 29.

Second structure 29 has sixth text information 202*f*, which identifies and describes a room within second structure 29 using annotated text, such as "Pool House Den 19'3"×19'3"."

Second structure 29 also has a seventh icon 60*g*, an eighth icon 60*h*, and a tenth icon 60*j*. Seventh icon 60*g*, eighth icon 60*h*, and tenth icon 60*j* can be any shape or size or any character or symbol, but are depicted in FIG. 6 as triangles having a numerical label. Seventh icon 60*g*, eighth icon 60*h*, and tenth icon 60*j* each represent a digital image of a portion of second structure 29.

It is contemplated that seventh icon 60*g*, eighth icon 60*h*, and tenth icon 60*j* can be located in the property overview image relative to the location within property 5 where each represented digital image was collected. It is also contemplated that seventh icon 60*g*, eighth icon 60*h*, and tenth icon 60*j* can indicate the direction and perspective of the represented digital image, such as by including a triangle which points in the direction in which the digital image was taken.

It is further contemplated that a user can access seventh icon 60*g*, eighth icon 60*h*, and tenth icon 60*j*, such as using a mouse, a keyboard, a touchpad, or a stylus to display the digital image represented by the accessed icon, such as in a display similar to that depicted in FIG. 7.

Second structure 29 also has third landscape image 113*c* and fourth landscape image 114*d* disposed adjacent to second structure 29. Third landscape image 113*c* and fourth landscape image 114*d* are graphic images that include lines and shapes depicting bushes, grasses, shrubs, and other plants. Fourth landscape image 113*d* further includes lines and shapes representing trees. Third landscape image 113*c* and fourth landscape image 113*d* can accurately depict the shape, dimensions, and contents of the represented landscape features, including the type of foliage, the positioning of major and minor plantings such as hedges and trees, and the arrangement of various plants.

Sixth graphic image 201*f* is disposed adjacent to second structure 29. Sixth graphic image 201*f* represents an air conditioning unit and includes lines and shapes to depict an air conditioning unit.

FIG. 6 also depicts garage 111, disposed adjacent to structure 28 and driveway 108. Garage 111 has second graphic image 201*b*, which represents a step. Eleventh text information 202*k* identifies and describes the step represented by second graphic image 201*b*. Garage 111 further has fourth graphic image 201*d*, which represents pegboard. Twelfth text information 202*l* identifies and describes the pegboard represented by fourth graphic image 201*d*.

Garage 111 also has tenth text information 202*j*, which identifies the existence of attic access in garage 111 using annotated text, such as "Attic Access."

Third graphic image 201*c* is disposed adjacent to garage 111. Third graphic image 201*c* represents pool equipment, and includes lines and shapes depicting pool equipment. Eleventh text information 202*i* identifies and describes the pool equipment represented by third graphic image 201*c*.

Seventh landscape image 113*g* is also disposed adjacent to garage 111. Seventh landscape image 113*g* is a graphic image including lines and shapes depicting bushes, shrubs, grasses, and other plants. Seventh landscape image 113*g* can accurately depict the shape, dimensions, and contents of the represented landscape features, including the type of foliage, the positioning of major and minor plantings such as hedges and trees, and the arrangement of various plants. Second tree 114*b* is also disposed adjacent to garage 111. Second tree 114*b* is a graphic image including lines and shapes depicting branches and a trunk. The positioning and size of second tree 114*b* can accurately depict the position and size of the tree represented by second tree 114*b*.

Pool 112 is depicted adjacent to garage 111, covered porch 119, and second structure 29. Eighth text information 202*h* describes and identifies pool 112 with annotated text, such as "Heated Pool." Fifth graphic image 201*e* is disposed in pool 112. Fifth graphic image 201*e* represents fountains and includes lines and shapes depicting fountains. Seventh text information 202*g* identifies and describes the fountains represented by fifth graphic image 201*e* using annotated text, such as "Bubbling Fountains."

Fifth icon 60*e* and sixth icon 60*f* are disposed adjacent to pool 112. Fifth icon 60*e* and sixth icon 60*f* can be any size or shape and any character or symbol, but are each depicted as a triangle with a numeric label. Fifth icon 60*e* and sixth icon 60*f* each represent a digital image and can be located in the property overview image relative to the location in property 5 where the represented digital image was taken.

It is contemplated that fifth icon 60*e* and sixth icon 60*f* can also indicate the direction and perspective of the represented digital image, such as by including a triangle which points in the direction in which the digital image was taken. It is further contemplated that a user can access fifth icon 60*e* and sixth icon 60*f*, such as by using a keyboard, a mouse, a touchpad, or a stylus to display the represented digital image in a display similar to that depicted in FIG. 7.

FIG. 6 additionally depicts off-street parking 110. Off-street parking 110 is a graphic image including lines and shapes depicting a parking area and two vehicles. First text information 202*a* identifies and describes off-street parking 110 with annotated text, such as "Off-Street Parking for Two Vehicles."

Referring now to FIG. 7, an embodiment of a display including a digital image and related text information is depicted. It is contemplated that a display similar to that depicted in FIG. 7 can be accessed through any of the icons 60*a*-60*j*, such as by using a mouse, a keyboard, a touchpad, or a stylus.

FIG. 7 includes a digital image 56. Digital image 56 can be any kind of image, including a digital photograph, a tape, a video, an online digital representation, or other images or mediums of display. Digital image 56 can be of any portion of a structure, such as structure 28, including interior rooms and exterior views. Digital image 56 can also be of any space outside or adjacent to a structure or a property, such as property 5. Digital image 56 can also have any perspective. Digital image 56 can also be of any view or perspective from the structure or property, such as view from a balcony, or a skyline as seen from the structure or property.

Digital image 56 is a digital image represented by the icon that was accessed to cause the display depicted in FIG. 7 to be displayed. FIG. 7 also depicts a digital image label 300, which includes text information describing the contents of Digital image 56. Digital image label 300 can identify the street address of the structure in which the digital image was taken, the room within the structure, or other relevant information.

FIG. 7 further depicts a dimension label 330, which can describe the dimensions of a room that is depicted by digital image 56. FIG. 7 also depicts a features listing 72, which includes text information describing the features, amenities, benefits, contents, materials, and structural characteristics of the room or space depicted by digital image 56.

FIG. 7 also includes a floor plan link 310 and an amenities link 320. It is contemplated that by accessing floor plan link 310, such as by using a mouse, a keyboard, a touchpad, or a stylus, a user can cause the property overview image, similar to the image depicted in FIG. 6, to be displayed. It is contemplated that by accessing the amenities link 320, a user can cause a full feature listing relating to the structure to be displayed, such as that depicted in FIG. 8. It is also contemplated that a property overview image can be separated into multiple parts, such as when the file size of a single property overview image exceeds that permitted by many real estate databases. A display similar to that depicted in FIG. 7 could have multiple floor plan links for linking to each part of the property overview image. It is further contemplated that multiple floor plan links could be included for linking to different stories of a multiple-story structure. In an embodiment, the display could also have one or more links for adding, removing, and/or arranging furniture icons within the property overview image.

Referring now to FIG. 8, an embodiment of a portion of a features listing relating to a structure, such as structure 28, is depicted. It is contemplated that a features listing such as that depicted in FIG. 8 can be accessed using an amenities link such as that depicted in FIG. 7. While the features listing depicted in FIG. 8 is only a partial features listing, it is contemplated that a full features listing can contain information pertaining to every room within a structure and one or more outside spaces adjacent to a structure. It is also contemplated that a features listing such as that depicted in FIG. 8 can include a property overview image that is sized and formatted so that the property overview image can be printed using a printer.

FIG. 8 includes a features listing label 350. Features listing label 350 can include information identifying the structure or property, such as a street address or other information. Features listing label 350 can also include information identifying the contents of the features listing depicted in FIG. 8.

FIG. 8 also includes first room label 360a, second room label 360b, a third room label 360c, and a fourth room label 360d. First room label 360a, second room label 360b, third room label 360c, and fourth room label 360d each identify a room within a structure and differentiate the identified room from other rooms.

FIG. 8 also depicts a first dimension label 330a, a second dimension label 330b, a third dimension label 330c, and a fourth dimension label 330d. First dimension label 330a indicates the dimensions of the room referenced by first room label 360a. Second dimension label 330b indicates the dimensions of the room referenced by second room label 360b. Third dimension label 330c indicates the dimensions of the room referenced by third room label 360c. Fourth dimension label 330d indicates the dimensions of the room referenced by fourth room label 360d.

FIG. 8 further depicts a first features listing 72a, a second features listing 72b, a third features listing 72c, and a fourth features listing 72d. First features listing 72a describes and identifies one or more features, amenities, benefits, contents, and structural characteristics present in the room identified by first room label 360a. Second features listing 72b describes and identifies one or more features, amenities, benefits, contents, and structural characteristics present in the room identified by second room label 360b. Third features listing 72c describes and identifies one or more features, amenities, benefits, contents, and structural characteristics present in the room identified by third room label 360c. Fourth features listing 72d describes and identifies one or more features, amenities, benefits, contents, and structural characteristics present in the room identified by fourth room label 360d.

In the exemplary partial features listing depicted in FIG. 8, first room label 360a, first dimension label 330a, and first text information 72a correspond to sixth room 30f, depicted in FIG. 5. Second room label 360b, second dimension label 330b, and second text information 72b correspond to first room 30a, depicted in FIG. 5. Third room label 360c, third dimension label 330c, and third text information 72c correspond to fourth room 30d, depicted in FIG. 5. Fourth room label 360d, fourth dimension label 330d, and fourth text information 72d correspond to the alcove portion of fourth room 30d, indicated by seventh room label 31g, depicted in FIG. 5.

The partial features listing depicted in FIG. 8 also includes a first floor plan link 310a and a second floor plan link 310b. A user can access first floor plan link 310a or second floor plan link 310b, such as using a mouse, a keyboard, a touchpad, or a stylus, to cause a property overview image relating to the structure to be displayed, similar to the property overview image depicted in FIG. 5.

While these embodiments have been described with emphasis on the embodiments, it should be understood that within the scope of the appended claims, the embodiments might be practiced other than as specifically described herein.

What is claimed is:

1. A property presentation and visualization method comprising:
   measuring at least one room of a structure, wherein the room comprises at least one room length and at least one room width forming at least one measurement line;
   inputting the at least one room length and the at least one room width to a processor in communication with data storage;
   measuring at least one wall interruption for the at least one room, wherein the at least one wall interruption comprises at least one wall interruption length forming a wall interruption measurement;
   inputting the wall interruption measurement to the processor;
   measuring at least one outside space adjacent the structure, wherein the at least one outside space comprises at least one outside space measurement;
   inputting the at least one outside space measurement to the processor;
   inputting textual information concerning the structure and at least one graphic image concerning the structure to the processor; wherein the textual information concerning the structure comprises a features listing;
   forming a property overview image of the structure and the at least one outside space using computer instructions in the data storage, the at least one room length, the at least one room width, the wall interruption measurement, the at least one outside space measurement, the at least one measurement line, the textual information, and the at least one graphic image, wherein the property overview image of the structure comprises nested images of outdoor spaces, floor plans, or combinations thereof;
   linking the features listing of the structure to the property overview image of the structure; and
   compiling an amenities link, a floor plan link, the property overview image, the features listing, and the textual information concerning the structure into a self-contained product that is deliverable to a client, a buyer, a seller, or a database via email.

2. The property presentation and visualization method of claim 1, further comprising the steps of:

placing at least one icon on the property overview image; and linking the at least one icon to at least one digital image of the structure or the at least one outside space.

3. The property presentation and visualization method of claim 1, further comprising measuring at least one room height while measuring the at least one room length and the at least one room width.

4. The property presentation and visualization method of claim 1, further comprising measuring at least one wall interruption width, at least one wall interruption height, at least one wall interruption elevation, or combinations thereof while measuring the wall interruption length to form the wall interruption measurement.

5. The property presentation and visualization method of claim 1, wherein the text information comprises annotations of measurements, storage, built-in furniture, fixtures, textures, features, materials, ceiling, flooring, or combinations thereof.

6. The property presentation and visualization method of claim 1, wherein the at least one graphic image is a drawing, an icon, a logo, a clip art, a symbol, or combinations thereof.

7. The property presentation and visualization method of claim 1, wherein the at least one graphic image depicts built-in furniture, fixtures, textures, features, materials, ceiling, flooring, or combinations thereof.

8. The property presentation and visualization method of claim 1, wherein the at least one graphic image corresponds to at least one feature listed in the features listing.

9. The property presentation and visualization method of claim 2, wherein the at least one digital image is a digital image of the at least one room, a digital image of the at least one outside space, a digital image of an area outside the structure taken from within the structure or from within the outside space, or combinations thereof.

10. The property presentation and visualization method of claim 1, further comprising the step of measuring a cabinet length, a cabinet width, and a cabinet height of at least one cabinet in the at least one room forming a cabinet measurement, and inputting the cabinet measurement to the processor.

11. The property presentation and visualization method of claim 1, further comprising the step of measuring a closet length and a closet width of at least one closet in the at least one room forming a closet measurement, and inputting the closet measurement to the processor.

12. The property presentation and visualization method of claim 11, further comprising the step of measuring a closet height while measuring the closet length and the closet width to form the closet measurement.

13. The property presentation and visualization method of claim 1, further comprising the step of locating at least one outlet in the at least one room and depicting the at least one outlet in the property overview image.

14. The property presentation and visualization method of claim 1, further comprising the step of using computer instructions to permit the user to magnify the property overview image, shrink the property overview image, or combinations thereof.

15. The property presentation and visualization method of claim 1, further comprising the step of using computer instructions to permit the user to add at least one furniture icon to the property overview image.

16. The property presentation and visualization method of claim 15, further comprising the step of using computer instructions to permit the user to move the at least one furniture icon within the property overview image, rotate the at least one furniture icon, caption the at least one furniture icon, enlarge the at least one furniture icon, shrink the at least one furniture icon, delete the at least one furniture icon, or combinations thereof.

17. The property presentation and visualization method of claim 1, further comprising the step of using computer instructions to permit the user to add at least one wall to the property overview image, remove at least one wall from the property overview image, or combinations thereof.

\* \* \* \* \*